US006958853B1

(12) United States Patent
Arnone et al.

(10) Patent No.: US 6,958,853 B1
(45) Date of Patent: Oct. 25, 2005

(54) MAGNETICALLY ENHANCED RADIATION SOURCE

(75) Inventors: Donald Dominic Arnone, Cambridge (GB); Craig Michael Ciesla, Cambridge (GB)

(73) Assignee: Teraview Limited, (GB)

( * ) Notice: Subject to any disclaimer, the term of this patent is extended or adjusted under 35 U.S.C. 154(b) by 66 days.

(21) Appl. No.: 10/089,488

(22) PCT Filed: Sep. 27, 2000

(86) PCT No.: PCT/GB00/03709

§ 371 (c)(1),
(2), (4) Date: Aug. 19, 2002

(87) PCT Pub. No.: WO01/23956

PCT Pub. Date: Apr. 5, 2001

(30) Foreign Application Priority Data

Sep. 27, 1999 (GB) .................................. 9922859

(51) Int. Cl.[7] .............................................. G02F 2/02

(52) U.S. Cl. ...................................................... 359/326

(58) Field of Search ................................ 359/326–332

(56) References Cited

U.S. PATENT DOCUMENTS

| 4,943,145 A | * | 7/1990 | Miyata ....................... 359/244 |
| 5,379,311 A | * | 1/1995 | McFarlane et al. ........... 372/41 |
| 5,811,822 A | * | 9/1998 | Huston et al. ............ 250/484.4 |

OTHER PUBLICATIONS

S. Izumida, et al., "Spectrum Control of THz Radiation From INAS In A Magnetic Field by Duration and Frequency Chirp of the Excitation Pulses", *Applied Physics Letters*, U.S. American Institute of Physics, New York, vol. 75, No. 4, Jul. 26, 1999, pp. 451-453.

P. Gu, et al., "Magnetic Field Dependence of THz Radiation From InSb Surface", *Technical Digest*, Summaries of Papers Presented at the Conference on Lasers and Electro-Optics, Postconference Edition, Cleo '99, Conference on Lasers and Electro-Optics (IEEE Cat. No. 99CH37013), pp. 372-373.

N. Sarukura, et al., "High Average-Power THz Radiation From Femtosecond Laser-Irradiated InAs in a Magnetic Field and its Elliptical Polarization Characteristics", *Journal of Applied Physics*, Jul. 1, 1998, AIP, USA, vol. 84, No. 1, pp. 654-656.

P.K. Benicewicz, et al., "Scaling of Terahertz Radiation from Large-Aperture Biased InP Photoconductors", *Optics Letters*, Aug. 15, 1993, U.S.A., vol. 18, No. 16, pp. 1332-1334.

X.C. Zhang, "Magnetic Switching of THz Beams", *Applied Physics Letters*, U.S., American Institute of Physics, New York, vol. 62, No. 17, Apr. 26, 1993, pp. 2003-2005.

* cited by examiner

Primary Examiner—John D. Lee
(74) Attorney, Agent, or Firm—Ostrolenk, Faber, Gerb & Soffen, LLP

(57) ABSTRACT

A radiation source comprising a frequency conversion member (1) configured to emit a beam of emitted radiation (7) with at least one frequency in the range from 0.1 THz to 100 THz, in response to irradiation with an input beam (3) with a frequency different to that of the emitted radiation (7), the source being subjected to a magnetic field (9) which has a component parallel to that of the emitted beam of radiation (7). The radiation source may be optimised by using both the fluence of the input beam and the magnetic field or may comprise a magnetically doped frequency conversion member or also have means for applying an electric field.

23 Claims, 21 Drawing Sheets

MAGNETICALLY ENHANCED RADIATION SOURCE

The present invention primarily relates to a radiation source for emitting radiation with frequencies ranging from the high Gigahertz range (GHz) up to an including the Terahertz range (THz). All such radiation is colloquially know as THz radiation, especially that in the range from 0.1 THz to 100 THz. More specifically, the present invention relates to a magnetically enhanced radiation source for such radiation.

Recently, there has been much interest in using THz radiation to look at a wide variety of samples using a range of methods. THz radiation has been used for both imaging samples and obtaining spectra. Recent work by Arnone et al, SPIE, European Conference Munich, June 1999, illustrates the use of THz radiation to image types of human and non human tissue.

THz radiation is of particular use because it penetrates most dry, non metallic and non polar objects like plastics, paper, cardboard and non polar organic substances. Therefore, THz radiation can be used instead of x-rays to look inside boxes, cases etc. THz has lower energy, non-ionising photons than X-rays, hence, the health risks of using THz radiation are expected to be vastly reduced compared to those using conventional X-rays.

To improve the usefulness of such THz radiation, there is a need to produce a THz source which can produce a relatively high energy beam of THz. To date, there are no compact solid state sources of THz radiation. However, recent advances in ultra fast pulsed lasers operating in the near infrared and visible have allowed coherent, broadband THz pulses to be produced from semiconductors. There are three widely-used methods for generating coherent THz from semiconductors irradiated by such ultrafast pulses: optical rectification, the surface field photocurrent effect, and lateral photocurrent effect using antennas. THz radiation is produced by irradiating a semiconductor material which possesses suitable properties with an input beam of optical or infra-red radiation which can be produced by a standard laser such as a Ti:Sapphire Laser. It would seem logical that to produce a strong THz source, all is required is a stronger input beam. However, this is not the case as the power of the emitted THz beam saturates as the power of the input beam is increased. Also, higher input beam powers may damage the crystal being irradiated.

It has been previously suggested that the THz output of such a semiconductor material can be controlled by subjecting the material to a magnetic field. Zhang et al. Appl. Phys. Lett 62 2003 (1993) showed that the direction and polarisation of a THz beam produced from a non-linear semiconductor crystal (in this case GaAs) could be controlled by subjecting the non-linear material to a magnetic field. The magnetic field here was oriented perpendicular to both the input beam and the THz beam. The THz beam was produced by transmission of the input beam through the non-linear material.

Some et al. Phys. Rev. B 53, R13 295 (1996) also used transmission geometry to investigate how THz emission using transmission geometry was affected by an applied magnetic field. Here, the field was applied both perpendicular to the input beam (and hence perpendicular to the emitted beam) and also at an angle of 25° from the input beam.

Sarukura et al. Appl. Phys. Lett. 84, 654 (1998) have recently shown enhanced THz emission using reflection geometry. Here, the non-linear material was positioned at 45° to the input beam, such that the emitted (or more correctly, the reflected) beam and input beam are arranged at right angles. In this arrangement, the magnetic field was arranged parallel to the input beam, but perpendicular to the emitted beam. Using a magnetic field with a strength of 1.7 T, Sarukura et al. achieved a THz beam having a power of several $\mu$ watts with a 1.5 W excitation power.

The present invention addresses the above problem of providing an enhanced source which is intended primarily for use on the THz frequency range and which has obtained better results than the previously discussed methods for enhancing THz emission.

In a first aspect, the present invention provides a radiation source comprising a frequency conversion member configured to emit a beam of emitted radiation in response to irradiation with an input beam with a frequency different to that of the emitted radiation, the source being subjected to a magnetic field which has a component parallel to that of the emitted beam of radiation, the emitted beam of radiation being produced by reflecting the input beam off a surface of the frequency conversion member.

Te source is primarily intended for use in the THz frequency range. Preferably, the emitted radiation has a frequency in range of 0.1 THz to 100 THz, more preferably from 1 THz to 84 THz even more preferably, from 1 THz to 20 THz.

Reflection geometry is chosen as there are losses in the radiation power as the THz beam transverses the frequency conversion member in transmission geometry.

The radiation source of the present invention is capable of producing a more efficient THz beam. The source of Sarukura et al. is capable of a conversion efficiency of $4.3 \times 10^{-5}$. However, the present invention is capable of a conversion efficiency in excess of this figure. For example, the present invention has obtained conversion efficiencies of $4.3 \times 10^{-3}$.

Preferably, the magnetic field is arranged at an angle of 20° or less to the emitted or reflected beam. More preferably, the magnetic field is arranged completely parallel to the emitted or reflected beam.

A number of different frequency conversion member could be used for example $LiIO_3$, $NH_4H_2PO_4$, ADP, $KH_2$, $A_5O_4$, Quartz, $AlPO_4$, ZnO, CdS, GaP, GaAs, $BaTiO_3$, $LiTaO_3$, $LiNbO_3$, Te, Se, ZnTe, ZnSe, $Ba_2NaNb_5O_{15}$, $AgAsS_3$, proustite, Cd, Se, CdSe, $CdGeAs_2$, $AgGaSe_2$, $AgSbS_3$, ZnS, BBO, KTP, DAST (4-N-methylstilbazolium). $L_4NbO_3$. The frequency conversion member will preferably be one of InAs, InSb or GaAs.

The magnetic field may be generated by an electromagnet or a permanent magnet. The source may comprise such a magnet. Preferably the frequency conversion member is cooled.

Experiments using sources according to the above mentioned aspects of the present invention have shown that the conversion efficiency does not saturate with magnetic field for an appropriate choice of incident pump energy per unit area (optical fluence). Therefore, preferably, the frequency conversion member is subjected to a magnetic field of at least 2 T.

How the efficiency of the emitted beam varies with the applied magnetic field is believed to be determined by at least three principal effects, the acceleration of surface charge due to the Lorentz force in a magnetic field; the carrier—carrier scattering of the free carriers of the frequency conversion member and the screening of the surface field of the frequency conversion member. Acceleration of charge due to Lorentz force in magnetic field, given by the formula:

$$E_{rad} \propto dJ/dt \propto dv/dt \propto E_{surf} + v \times B \qquad (0)$$

where $E_{rad}$ is the field of the radiation, J is the surface current, v is the velocity of charged force carriers and $E_{surf}$ is the surface field.

Maximising the acceleration of charge will in general maximise the power of the emitted beam. The application of a magnetic field enhances the acceleration. However, the acceleration can be further enhanced by using a frequency conversion member which has been magnetically doped.

It has previously been shown that a large Faraday effect can be seen in semiconductors which have been doped using magnetic ions such as Mn.

In a second aspect, the present invention provides a radiation source comprising a frequency conversion member configured to emit a beam of emitted radiation in response to being irradiated with an input beam with a frequency different to that of the emitted beam, the frequency conversion member being doped with a magnetic material.

In use, the source is subjected to a magnetic field.

More preferably, the magnetic dopant is Mn. However, other magnetic dopants such as Tc or Re could be used.

The acceleration can also be enhanced by applying an electric field to the frequency conversion member in addition to the magnetic field.

Therefore, in a third aspect, the present invention provides a radiation source comprising a frequency conversion member configured to emit a beam of emitted radiation in response to being irradiated with an input beam with a frequency different to that of the emitted beam, the source being subjected to a magnetic field, the source further comprising means for applying an electric field at the surface of the frequency conversion member which is irradiated by the input beam.

The means for applying the electric field can be provided by two Ohmic contacts provided to the frequency conversion member and means for applying a bias to accelerate the photocarriers between these two contacts. The Ohmic contacts may be shaped so that they taper towards one another. In other words, they form a "bow-tie" shape.

The means may also be provided by a front gate which overlies the surface of the frequency conversion member which is irradiated by the input beam.

Preferably, the frequency conversion member comprises a magnetic dopant. More preferably, the magnetic dopant comprises Mn. Also, the input beam is preferably circularly polarised.

In the radiation sources of the second and third aspect of the present invention, the magnetic field preferably has a component parallel to that of the emitted beam. More preferably, the magnetic field is at an angle of at most 20° to the emitted beam.

More preferably, the emitted beam is produced by reflection of the input beam off a surface of the frequency conversion member.

Although it is always desirable to enhance the acceleration of the charge, scattering and screening also affect the efficiency of the source. The source can be viewed as having a low optical fluence regime and a high optical fluence regime. In the low fluence regime carrier—carrier scattering is the dominant mechanism limiting the enhancement of the power of the emitted beam. In the high fluence regime, screening of the surface electric field is the dominant mechanism which limits the enhancement of the power of the emitted beam.

In the presence of a fixed magnetic field such as one might find in a superconducting magnet in persistent mode (the type found for example in MRI machines) or a fixed permanent magnet, the two optical fluence regimes can be determined by plotting out the experimentally measured power of the emitted beam as function of adjusted optical fluence (determined by laser power and/or spot size adjustment, or other means) for different magnetic field values.

The time-averaged power of the emitted beam can be approximated with the expression:

$$P \propto \frac{n^2 B^2}{m^4} \left[ \frac{\cos\theta_M \sin\theta_M}{2\theta_M} + \frac{1}{2} \right], \qquad (1)$$

where P is the power of the emitted beam, n is the free carrier concentration, m is the effective mass of the carriers, B is the magnetic field, and $\theta_M$ represent the angle completed by the carrier at the time of the collision, and r is the cyclotron radius. This angle can be expressed as a function of the ratio $R = \lambda/r$ of the characteristic radius as $$\theta_M = \arccos\left[ 1 - \frac{1}{2}\left(\frac{\lambda}{r}\right)^2 \right], \qquad (2)$$

where $\lambda$ is the mean free path which is defined as n−1/3/2.

The above expression is only valid for $(\lambda/r) < \sqrt{2}$. For magnetic fields B smaller than 10 T, (2) can be approximated as a linear function of B, $\theta_M \approx \alpha B$. In this limit, (1) reduces to:

$$P \propto \frac{1}{m^4} \left[ \frac{B \sin(2\alpha B)}{4\alpha} + \frac{B^2}{2} \right] \qquad (3)$$

Fitting the calculated emitted beam power of (1) as function of optical fluence (or equivalently, photogenerated carrier density n) with the measured values allows one to determine whether one is in the low or high optical fluence limit.

In the low fluence limit it is possible to fit (1) to the experimental data by applying a suitable multiplicative factor to one or the other data set. In the high fluence limit, there is significant deviation of experimental data below the prediction of (1) as the optical fluence increases.

In this high fluence regime, it is believed that screening dominates and reduces the source efficiency, i.e. the (emitted beam power)/(the input beam power) as the optical fluence increases. In the high optical fluence regime, screening of the surface field becomes the dominant mechanism, and the term $E_{surf}$ is dramatically reduced.

It is often desirable to generate the largest power possible from a source. Increasing the power of the input beam will in most (but not all) cases increase the power of the emitted beam. However, the screening which occurs in the high fluence regime means that once the high fluence regime is entered, the efficiency of the source decreases. Hence, it is not desirable to increase the input beam power to enter this regime. Therefore, there is a need to be able to determine the start of this regime. The inventors of the present invention have determined how to establish this and have also surprisingly found that the point at which this regime is entered is dependent upon the applied magnetic field as well as the fluence of the input beam.

Therefore, according to a fourth aspect, the present invention provides a radiation source comprising a frequency conversion member configured to emit a beam of emitted radiation in response to irradiation with an input beam having a frequency different to that of the emitted beam of radiation, the source being subjected to a magnetic field, the magnetic field and fluence of the input beam being configured to minimise the screening effect of free carriers in the frequency conversion member.

In fifth aspect, the present invention provides a method of optimising a radiation source, the radiation source comprising a frequency conversion member configured to emit a beam of emitted radiation in response to irradiation with an input beam with a frequency different to that of the emitted radiation, the method comprising the step of applying a magnetic field to the source, the magnitude of the magnetic field being chosen in order to minimise the screening of the surface field of the frequency conversion member by free carriers in the frequency conversion member for a predetermined fluence of the input beam.

In a sixth aspect, the present invention provides a method of optimising a radiation source, the radiation source comprising a frequency conversion member configured to emit a beam of emitted radiation in response to irradiation with an input beam with a frequency different to that of the emitted radiation, the method comprising the step of applying a magnetic field to the source, the fluence of the input beam being chosen in order to minimise the screening of the surface field of the frequency conversion member by free carriers in the frequency conversion member for a predetermined magnitude of the applied magnetic field.

In the high optical fluence regime, the efficiency of the source can be optimised by determining the point at which the measured power deviates from the predicted value of (1) with increasing optical fluence for the applied magnetic field. It has been found that the point at which the emitted power deviates from that predicted by (1) varies exponentially with applied magnetic field. Therefore, by measuring the divergent values, it is possible to predict the optimum optical fluence for a given magnetic field and vice versa.

Therefore, preferably, the method of the fifth and sixth aspects of the present invention determine the magnitude of the magnetic field or the optical fluence by the steps of:

a) measuring the power of the emitted beam as a function of optical fluence for at least three values of magnetic field;

b) fitting the data measured in a) to the relation:

$$P \propto \frac{n^2 B^2}{m^4} \left[ \frac{\cos\theta_M \sin\theta_M}{2\theta_M} + \frac{1}{2} \right], \quad (1)$$

where P is the power of the emitted beam, n is the free carrier concentration, m is the effective mass of the carriers, B is the magnetic field and $\theta_M$ is:

$$\theta_M(n, B) = \arccos\left[ 1 - \frac{1}{2}\left(\frac{\lambda}{r}\right)^2 \right], \quad (2)$$

where $\lambda$ is the mean free path which is defined as $\frac{1}{2}(n^{-1/3})$ and r is the cyclotron radius;

c) determining the fluence values for the at least three values of magnetic field where with increasing fluence, the measured power starts to diverge from the function of step b); and d) fitting an exponential function to the at least three values determined in point c) such that the optimum fluence can be determined for a given magnetic field or an optimum magnetic field can be determined for a given fluence.

Preferably, the fitting in step (b) is performed by weighting the points with a lower optical fluence.

The exponential fit in step (d) is preferably made to the function having the general form:

$$F = F_0 + A\exp(B/t)$$

where F is the fluence, B the magnetic field and $F_0$, A and t are the parameters to be fitted. Once these parameters are determined, the optimum fluence for a given magnetic field or the optimum field for a given fluence can be determined.

The fluence values where the measured power starts to diverge can be taken as where the measured power drops more than 10% below the theoretical value, more preferably more than 5% below the theoretical value.

In the limit of low fluence, electron—electron scattering will reduce THz power appreciably until the limit where the cyclotron diameter (2 r) is comparable to the electron—electron scattering length, i.e. 2 r is close to the electron-electron scattering length $\lambda = n^{-1/3}/2$.

Therefore, in a seventh aspect, the present invention provides a radiation source comprising a frequency conversion member configured to emit a beam of emitted radiation response to irradiation with an input beam with a frequency different to that of the emitted radiation, the source being subjected to a magnetic field wherein the free carrier concentration of the frequency conversion member and the applied magnetic field is configured such that the cyclotron diameter of the free carriers in the frequency conversion member is within 30% of their scattering length.

The scattering length being defined by $\lambda = n^{-1/3}/2$. The cyclotron diameter can be 30% larger or 30% smaller than the scattering length.

Preferably, the cyclotron diameter of the free carriers is within 20% of the carrier-carrier scattering length, more preferably 10%, even more preferably 5%.

Both the cyclotron diameter and the electron—electron scattering length are dependent on B and n (optical fluence). Thus, these need to be optimised simultaneously.

Scattering between adjacent electrons results in decoherence of the waveforms of the emitted beam and hence reduce the emitted power. Decoherence here means that the emitted waveforms from the accelerated charge do not add or combine constructively, i.e. no constructive interference. In general, electron—electron (or more generally carrier—carrier) scattering is the dominant mechanism at lower optical fluences, leading to low photogenerated carrier densities. The above ensures that the length of the electron trajectory s is maximised before scattering off the next adjacent electron located $\lambda$ away.

Typically, the wavelength of the input or pump beam for any of the above sources will be such that the photon pump energy is larger than the band gap of the frequency conversion member. Preferably, source will be configured such that the input beam is at the Brewster angle of the frequency conversion member, i.e. at the Brewster angle to the surface normal. The Brewster angle will be about 70° to the surface normal. Therefore, typically, the input beam will be preferably arranged between 45° and 85°, more preferably between 60° and 80°.

It should be noted that a radiation source may be provided which comprises any combination of a magnetically doped frequency conversion member and means for applying an electric field to the frequency conversion member. This source may also be configured with the reflection geometry of the first aspect of the present invention. The applied magnetic field and the fluence of the input beam may also be optimised to reduce scattering or screening effects in a source having a magnetically doped frequency conversion member and/or means for applying an electric field to the frequency conversion member and/or which is configured with the reflection geometry of the first aspect of the present invention.

All of the above sources are preferably used to generate radiation having at least one frequency in the range from 0.1 THz to 100 THz. The input beam may be a pulsed beam or a so-called CW beam.

The present invention will now be described with reference to the following preferable, non-limiting embodiments, in which.

Figure 8A:
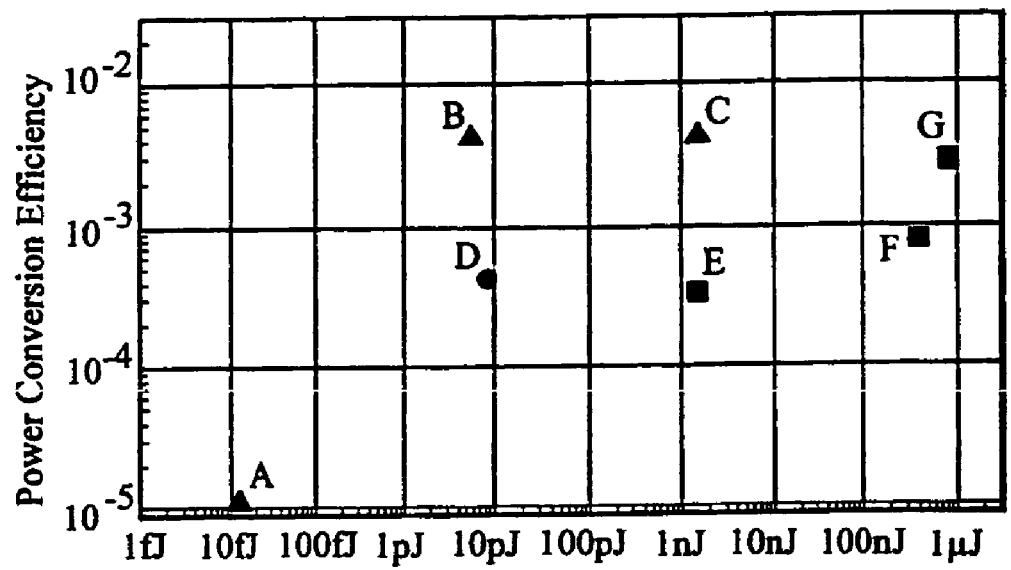
Figure 8B:
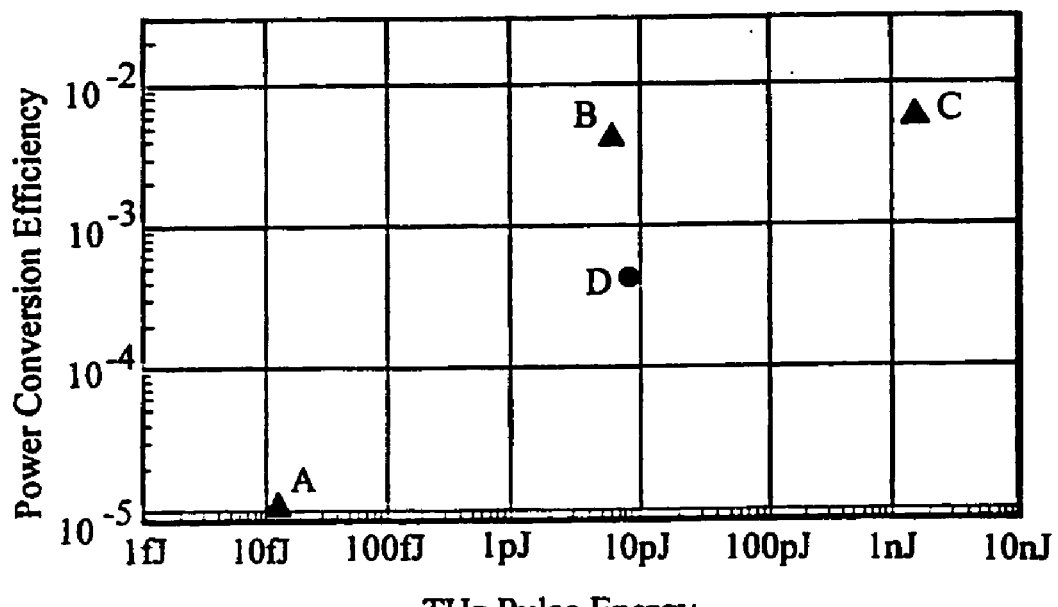
Figure 9:
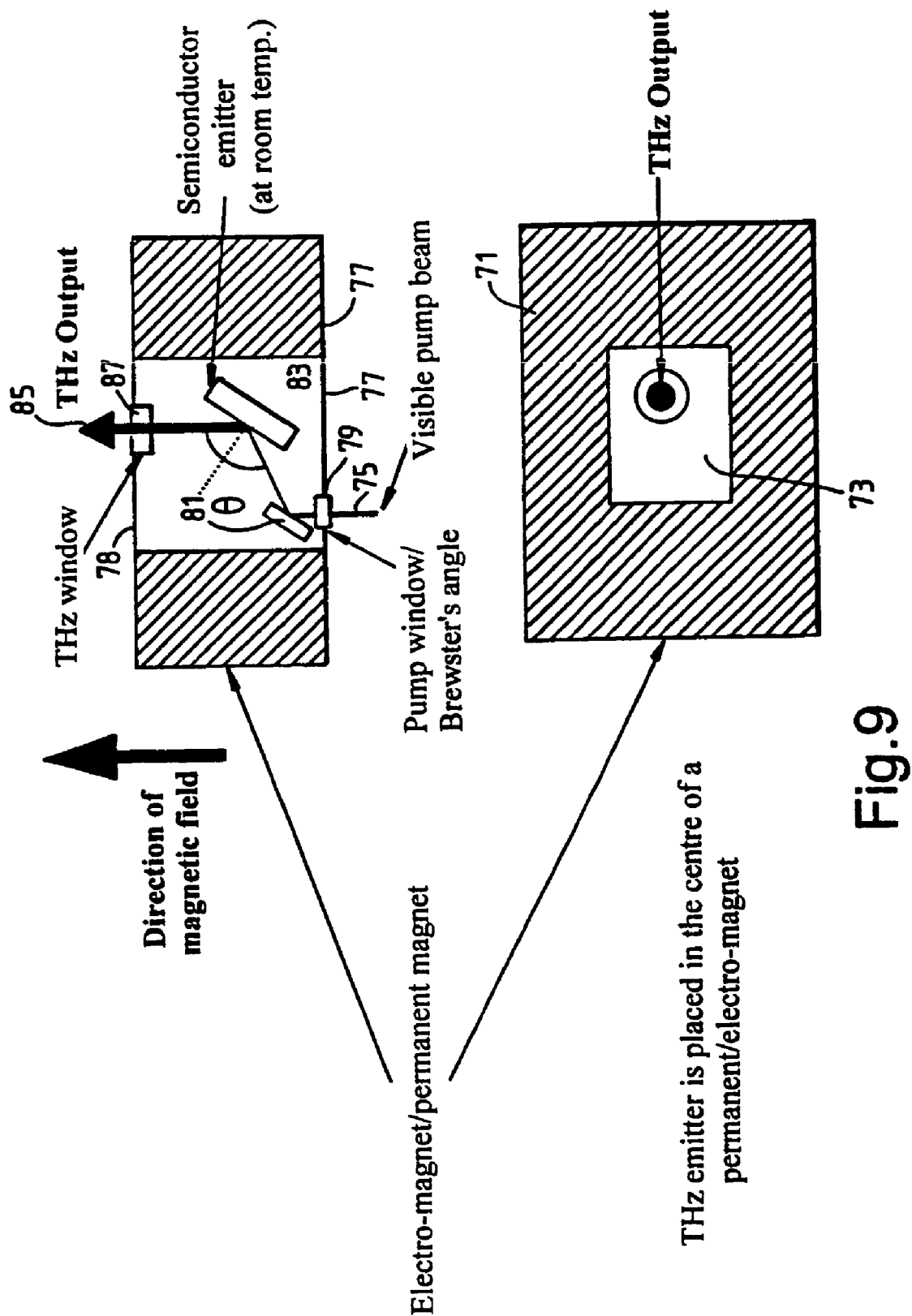
Figure 10:
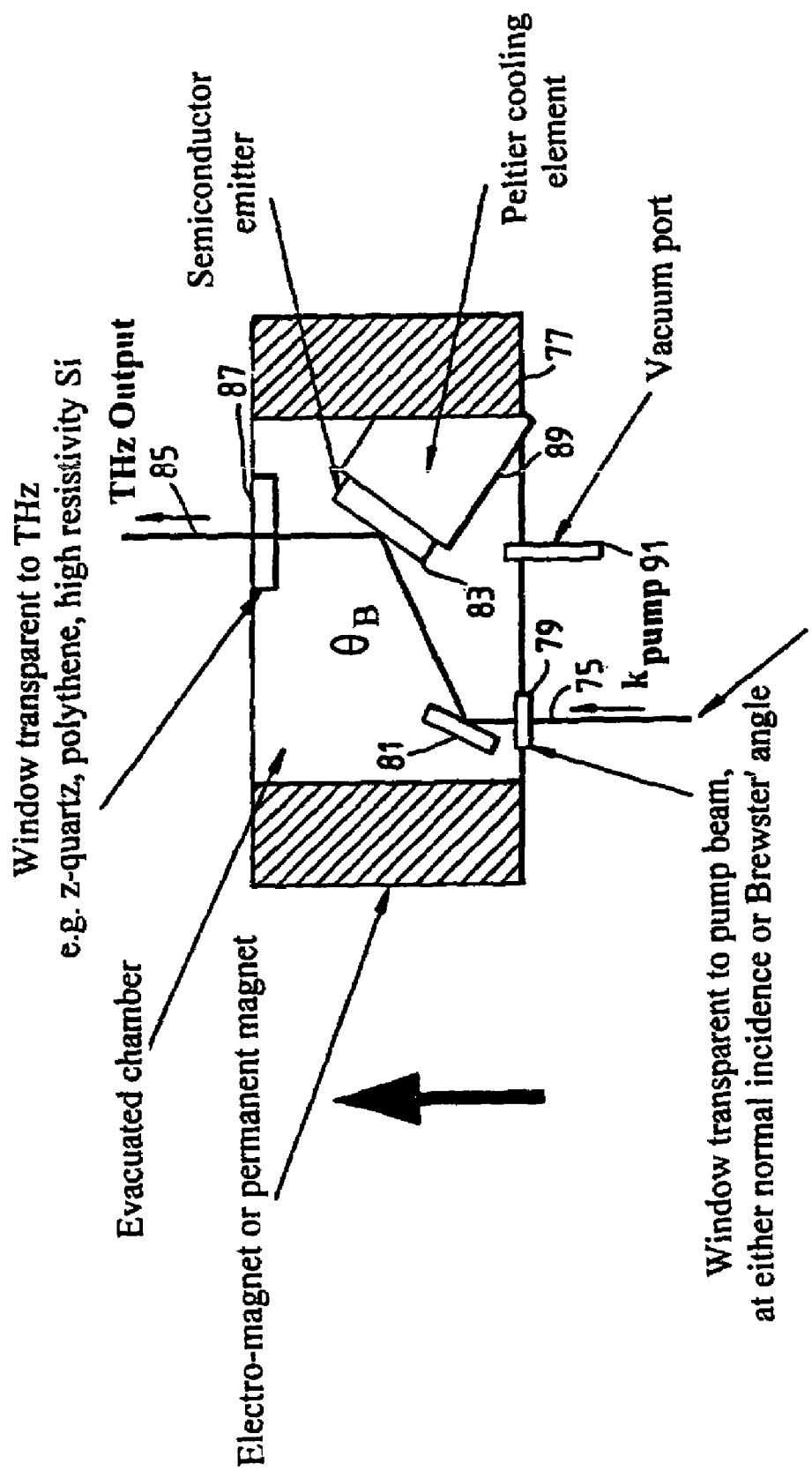
Figure 11:
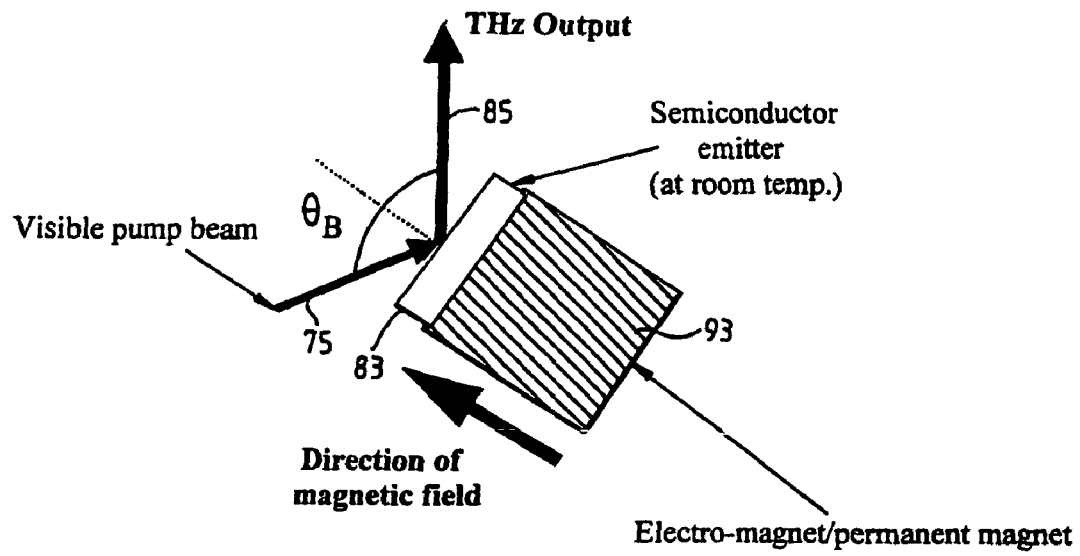
Figure 12:
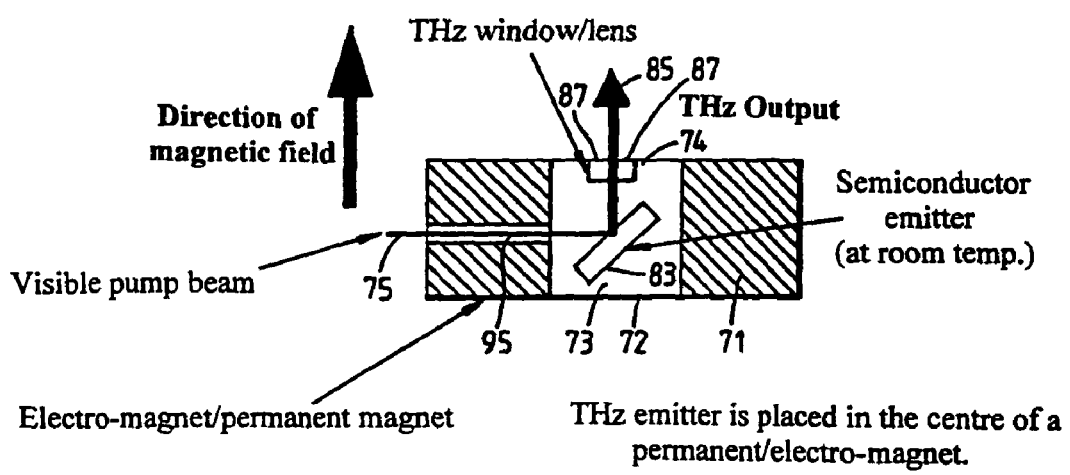
Figure 13:
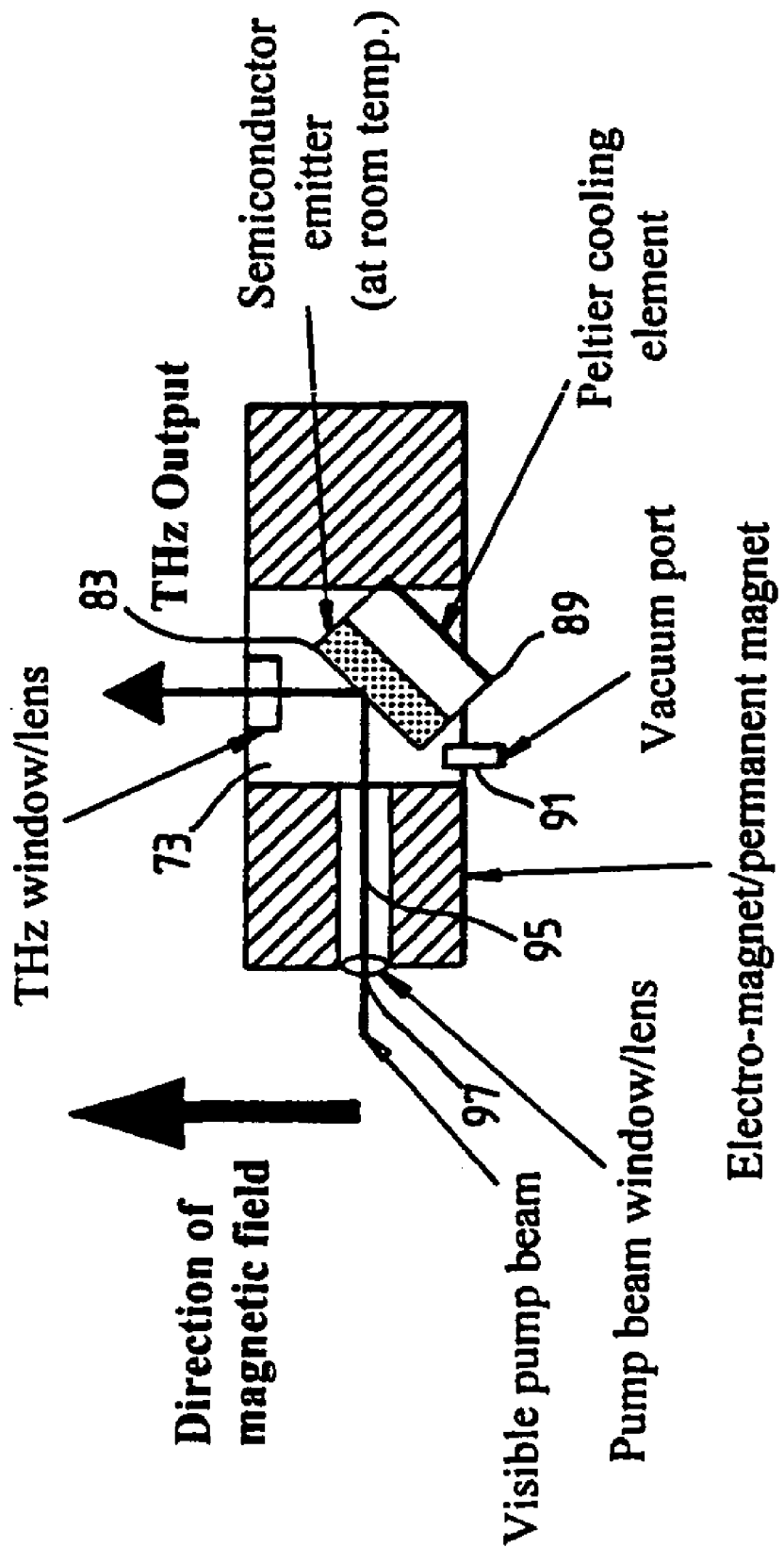
Figure 14:
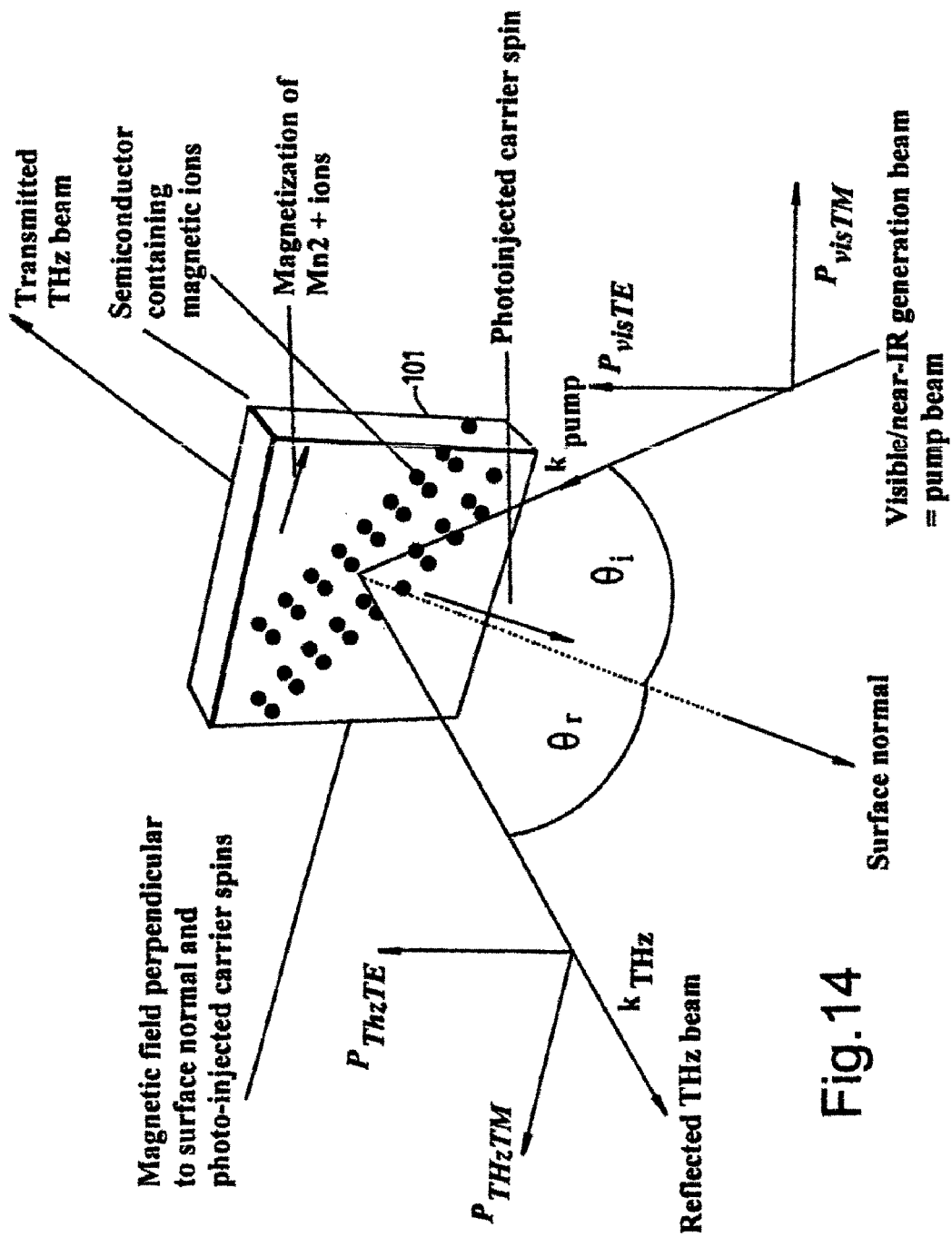
Figure 15:
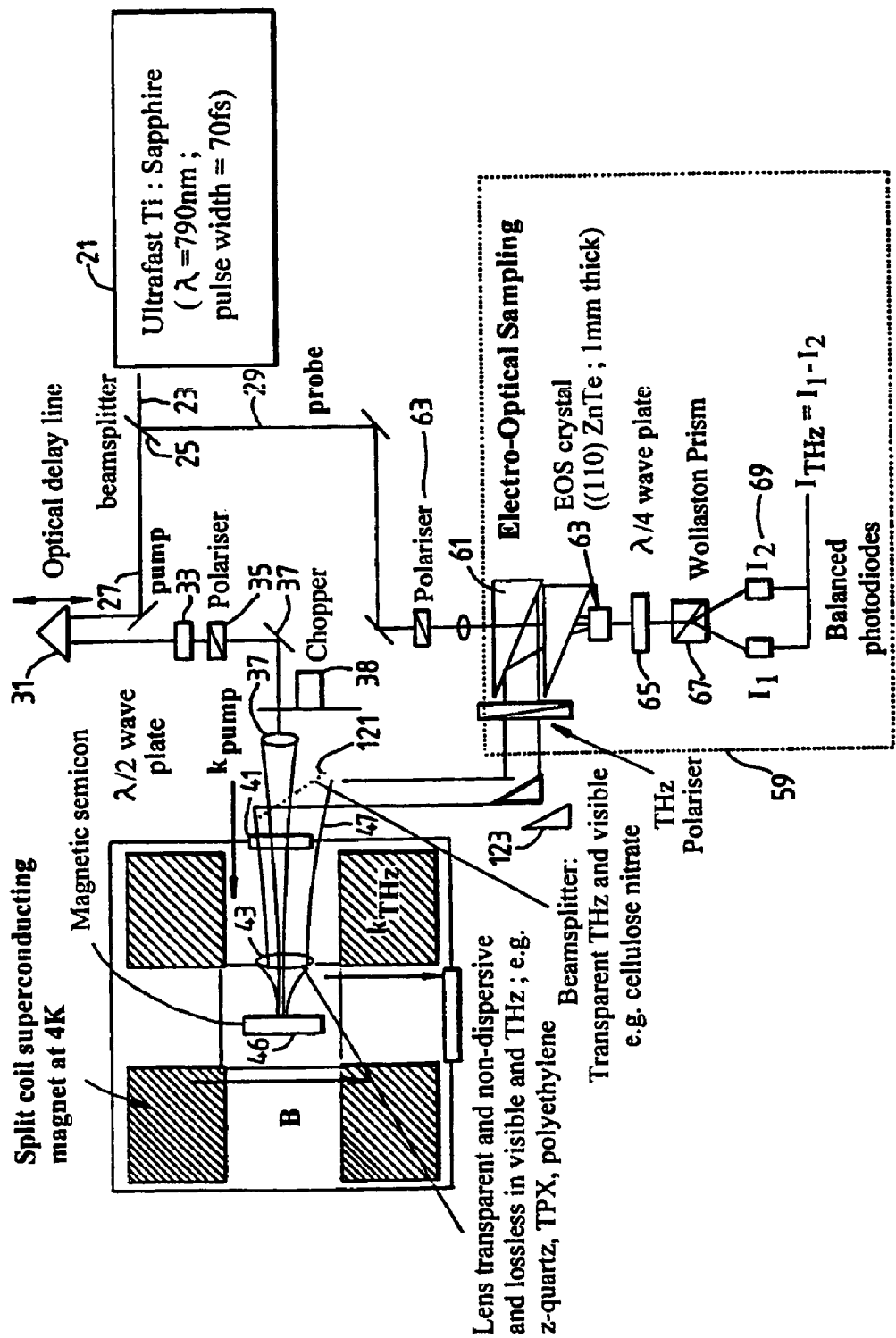
Figure 16:
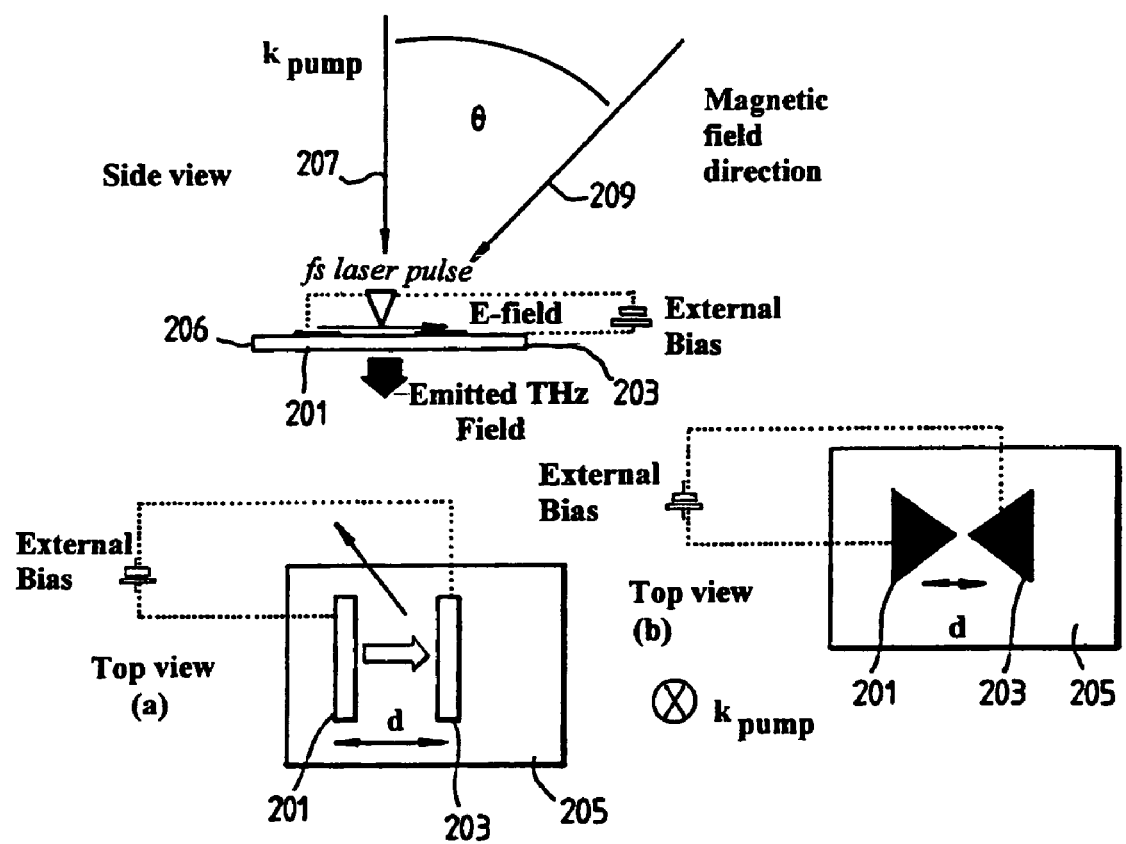
Figure 17A:
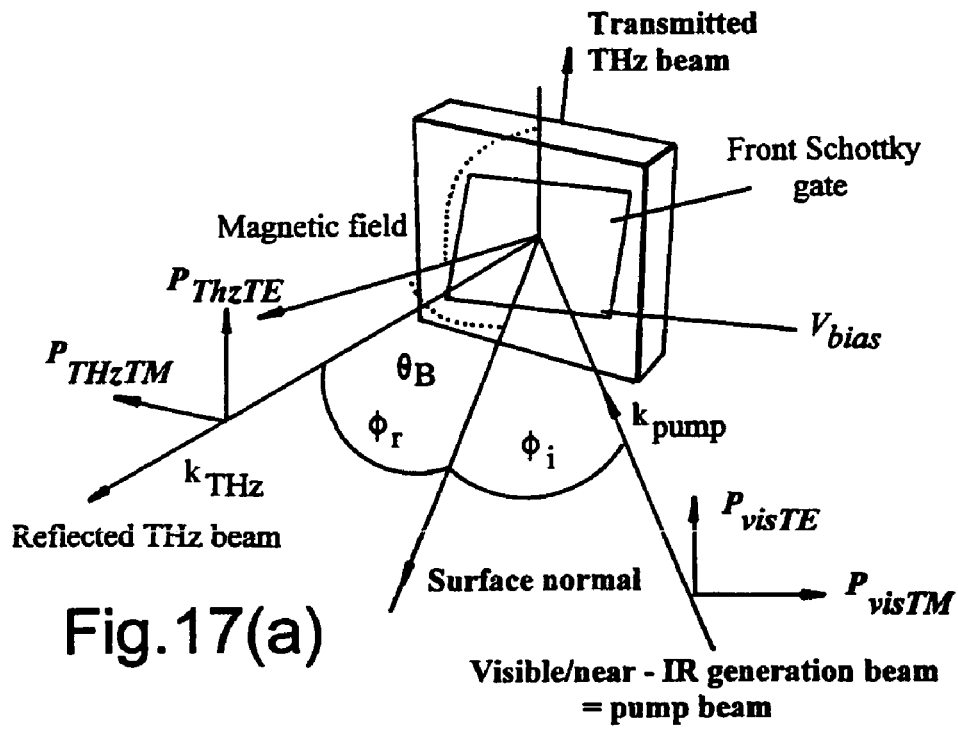
Figure 17B:
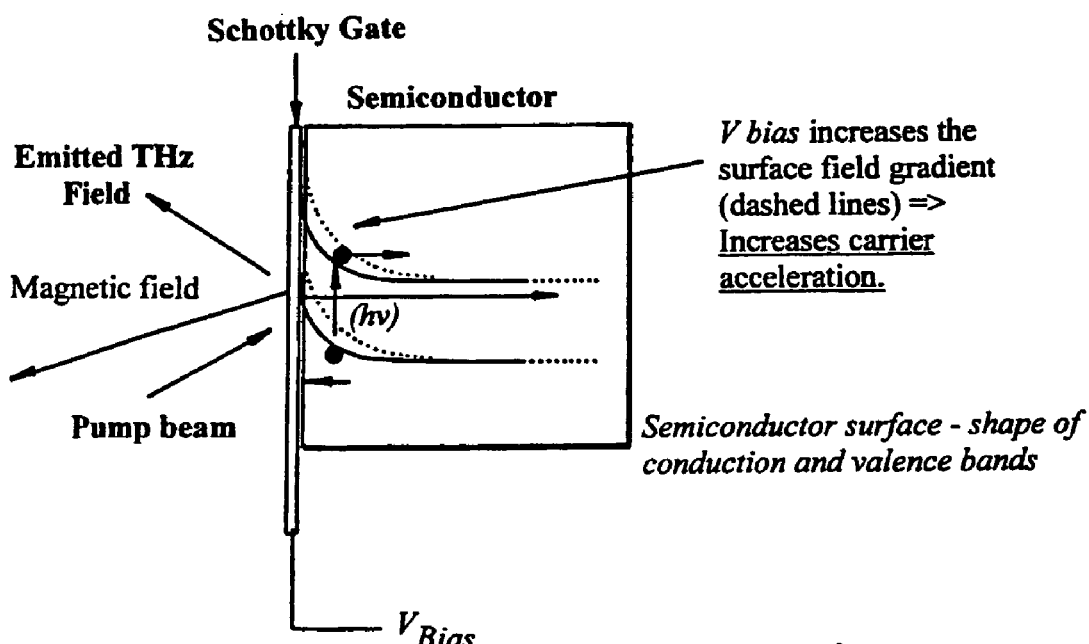

FIGS. 8(a) and 8(b) are plots comparing the efficiency of THz generation according to an embodiment of the present invention as compared with the known prior art;

FIG. 9 shows a compact THz emitter in accordance with an embodiment of the present invention;

FIG. 10 shows a compact THz emitter in accordance with a further embodiment of the present invention;

FIG. 11 shows a compact emitter in accordance with another embodiment of the present invention;

FIG. 12 shows a THz emitter in accordance with another embodiment of the present invention;

FIG. 13 shows a variation on the emitter of FIG. 12;

FIG. 14 shows a magnetically doped THz emitter in accordance with an embodiment of the present invention;

FIG. 15 shows an experimental arrangement for detecting THz radiation from the source of FIG. 14;

FIG. 16 shows an embodiment of the present invention which uses an electric field as well as a magnetic field to enhance THz production;

FIGS. 17(a) and 17(b) show a further embodiment of the present invention where a front gate overlies a surface of the THz emitter.

Figure 18:
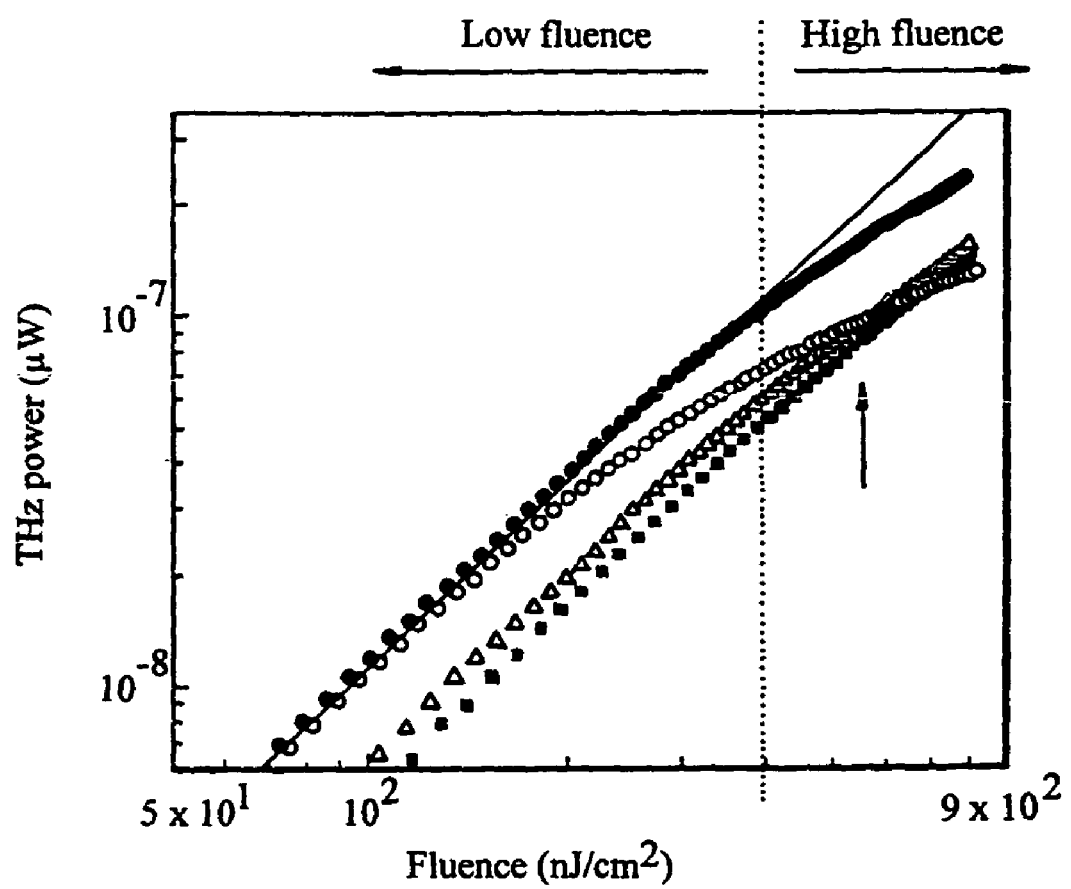
Figure 19:
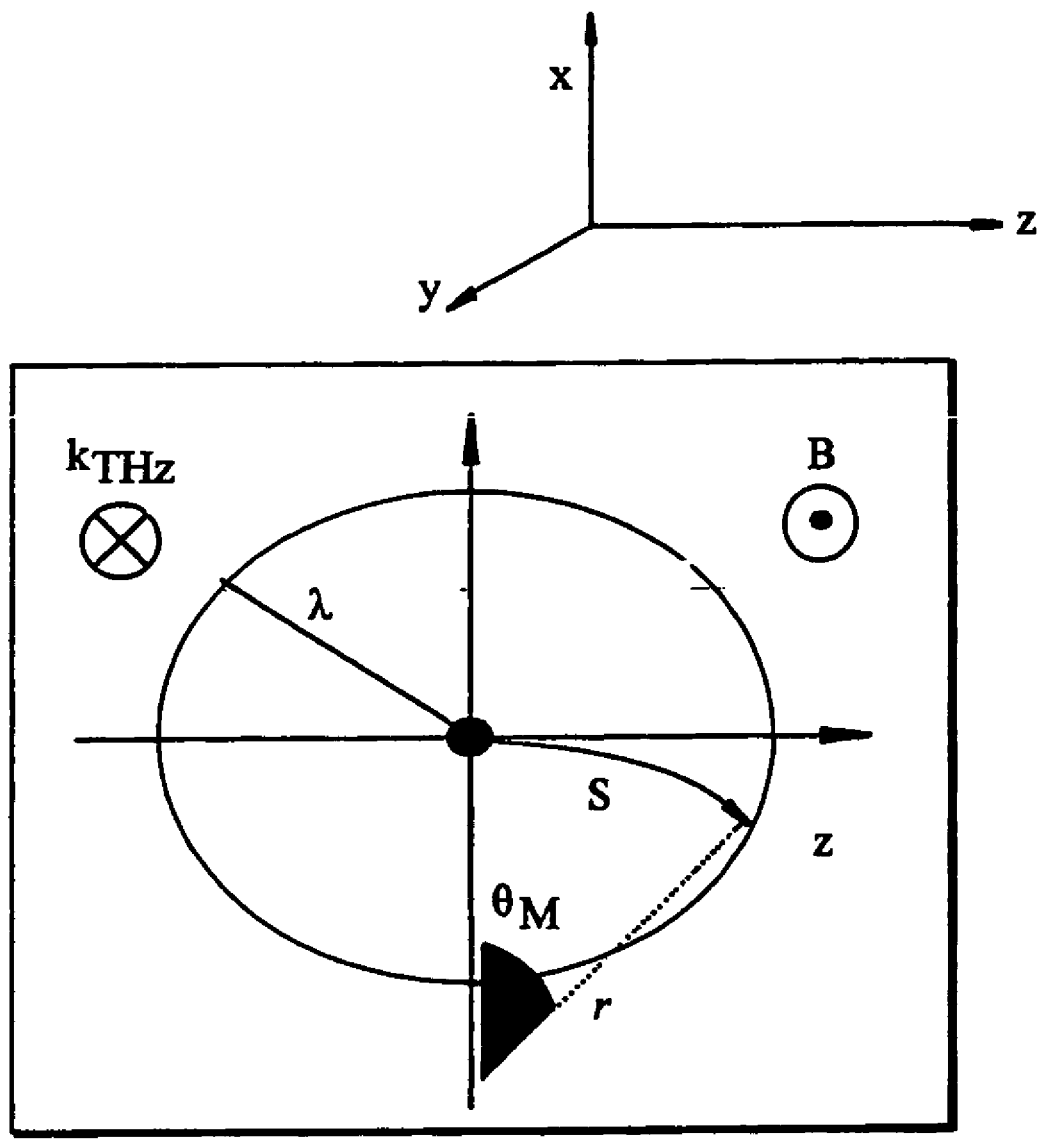
Figure 20:
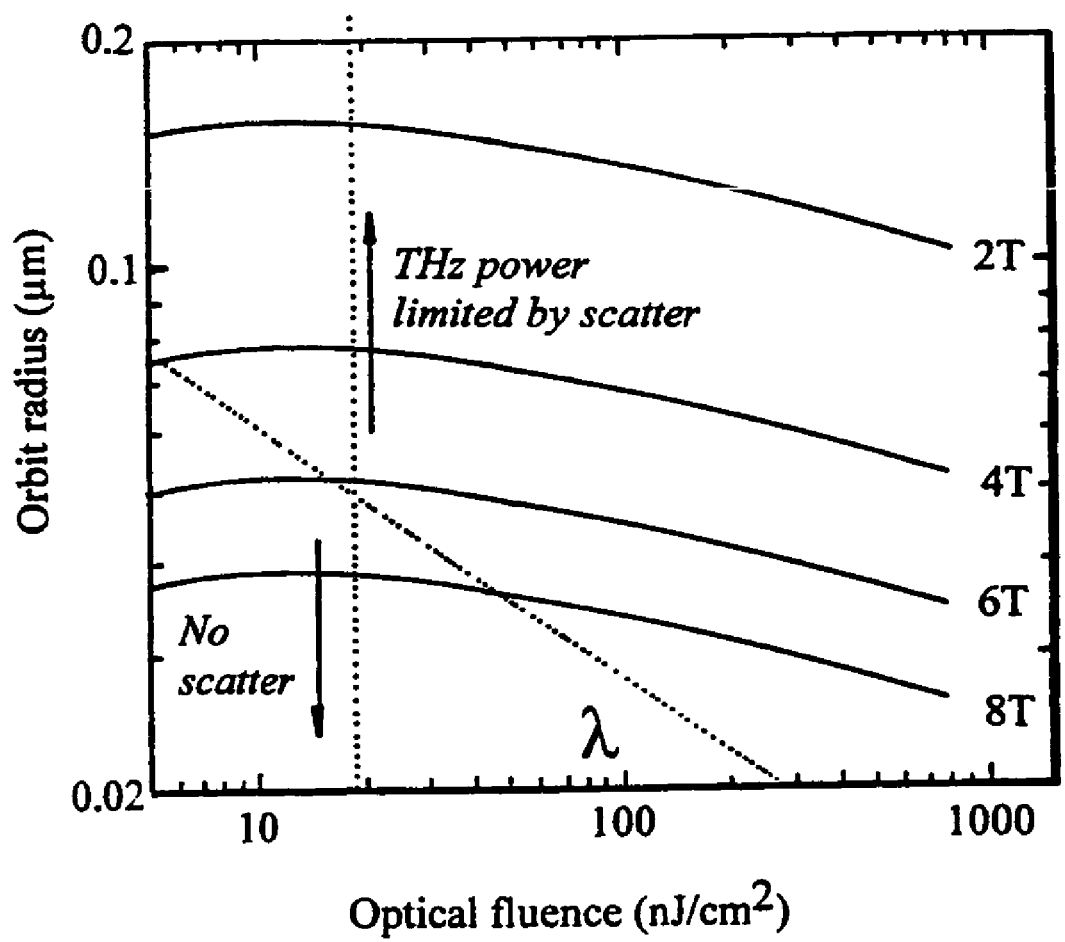
Figure 21:
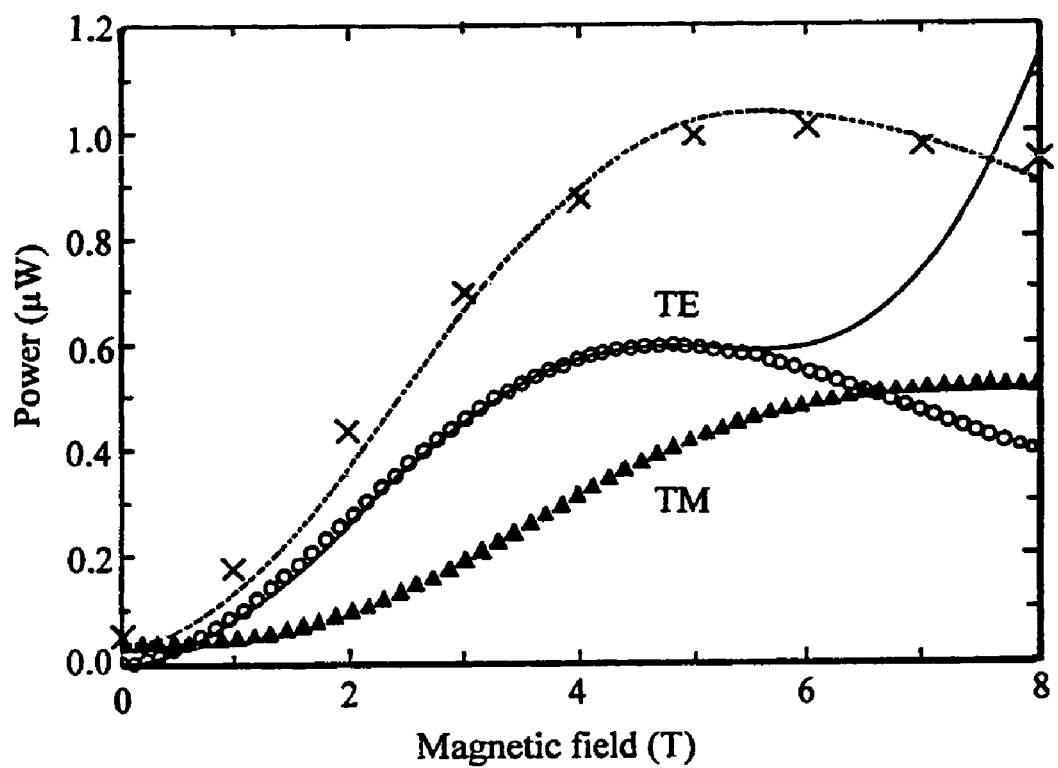
Figure 22:
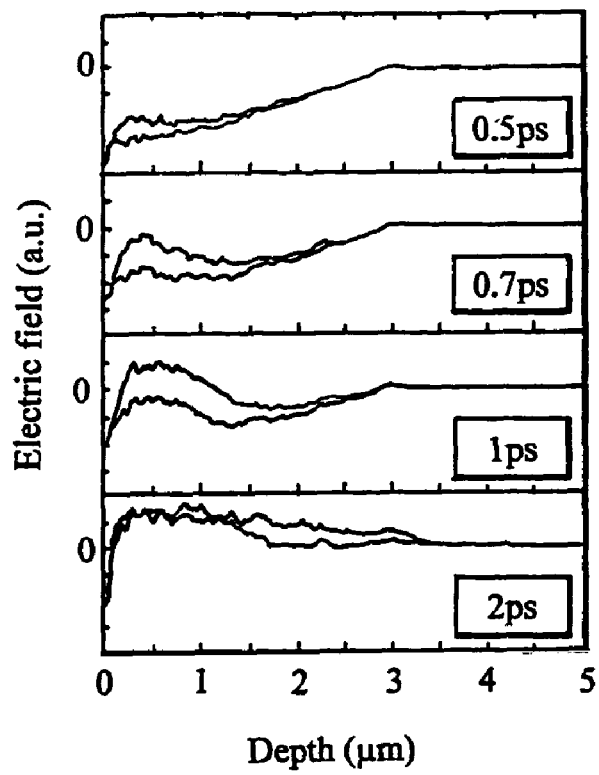
Figure 23:
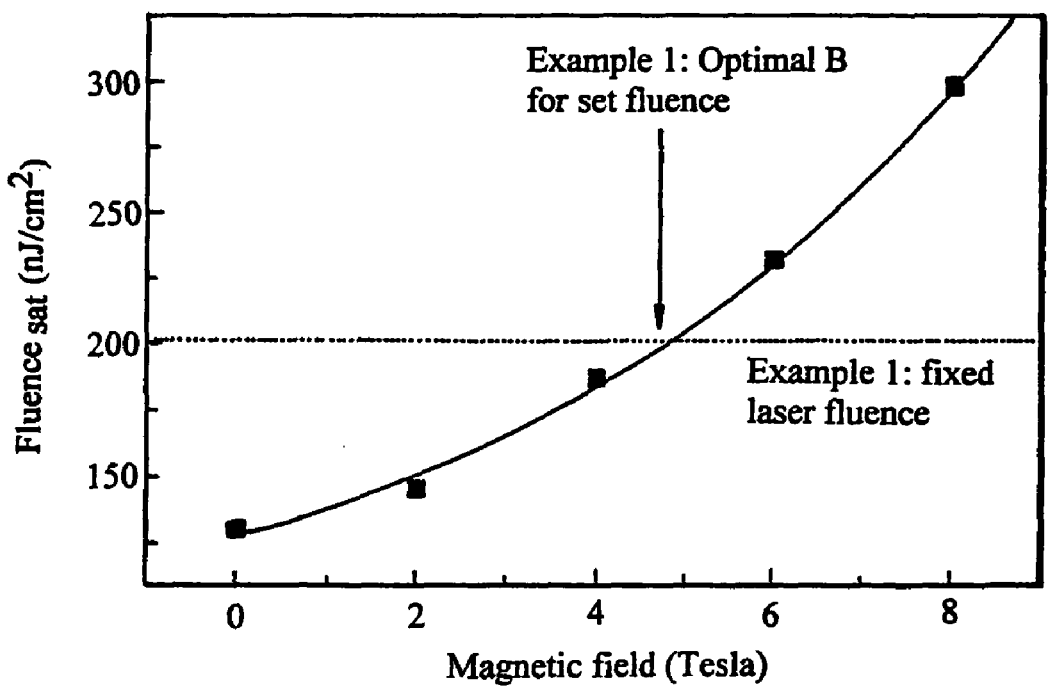

FIG. 18 shows a plot of the power of the emitted beam against the optical fluence of the input beam for a source in accordance with an embodiment of the present invention;

FIG. 19 shows a schematic cyclotron orbit of a carrier in the frequency conversion member of a source in accordance with an embodiment of the present invention;

FIG. 20 shows a plot of the cyclotron orbit radius against the optical fluence of the input beam of a source in accordance with an embodiment of the present invention;

FIG. 21 shows a plot of the power of the emitted THz beam against the applied magnetic field of a source in accordance with an embodiment of the present invention;

FIG. 22 shows a Monte Carlo simulation of the electric field against depth from the surface of a source in accordance with an embodiment of the present invention; and FIG. 23 shows a plot of optical fluence of the input beam against the applied magnetic field for a source in accordance with an embodiment of the present invention, the solid line shows the optimal magnetic field for a set fluence.

Figure 1:
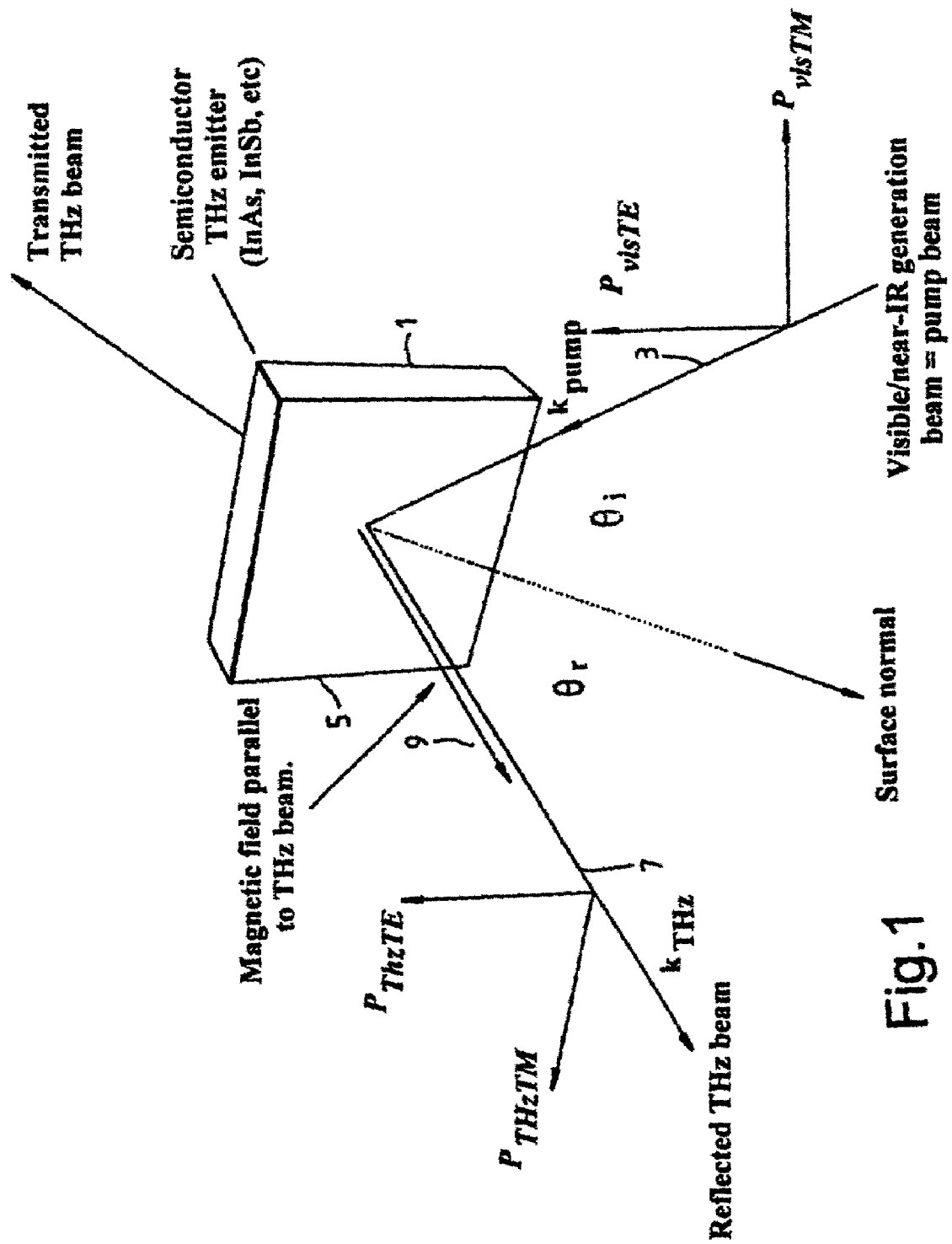
FIG. 1 is a schematic of a source in accordance with an embodiment of the present invention.

FIG. 1 shows a THz emitter according to an embodiment of the present invention. The THz emitter has a frequency conversion member 1 which is either InAs, InSb, or GaAs.

It should be noted that other types of frequency conversion member are possible either crystalline or non-crystalline. For example, LiIO3, NH4H2PO4, ADP, KH2, A5O4, Quartz, AlPO4, ZnO, CdS, GaP, GaAs, BaTiO3, LiTaO3, LiNbO3, Te, Se, ZnTe, ZnSe, Ba2NaNb5O15, AgAsS3, proustite, Cd, Se, CdSe, CdGeAs2, AgGaSe2, AgSbS3, ZnS, BBO, KTP, DAST (4-N-methylstilbazolium), L4NbO3.

A pump beam 3 is directed towards member 1 at an angle θi to the surface normal of member 1. The pump beam is reflected from the surface 5 of emitter 1 as a THz beam at an angle θr to the surface 5 normal. The emitter is subject to a magnetic field along the direction of the emitted THz beam 7. As the magnetic field direction 9 is parallel to the direction of the THz beam 7, both the transverse electric $P_{THz}T_E$ and the transverse magnetic $P_{THz}T_M$ polarisation components of the THz beam are subject to a magnetic field.

The pump beam will typically have wavelengths in the range 2 mm to 350 nm. The pump wavelength will be such that the pump photon energy is larger than the band gap energy of the frequency conversion member 1. The pump beam will be a pulsed beam with a plurality of frequencies contained within each pulse. The semiconductor frequency conversion member 1 can emit a THz beam that is a difference of two of the frequencies in the pump beam.

Figure 2:
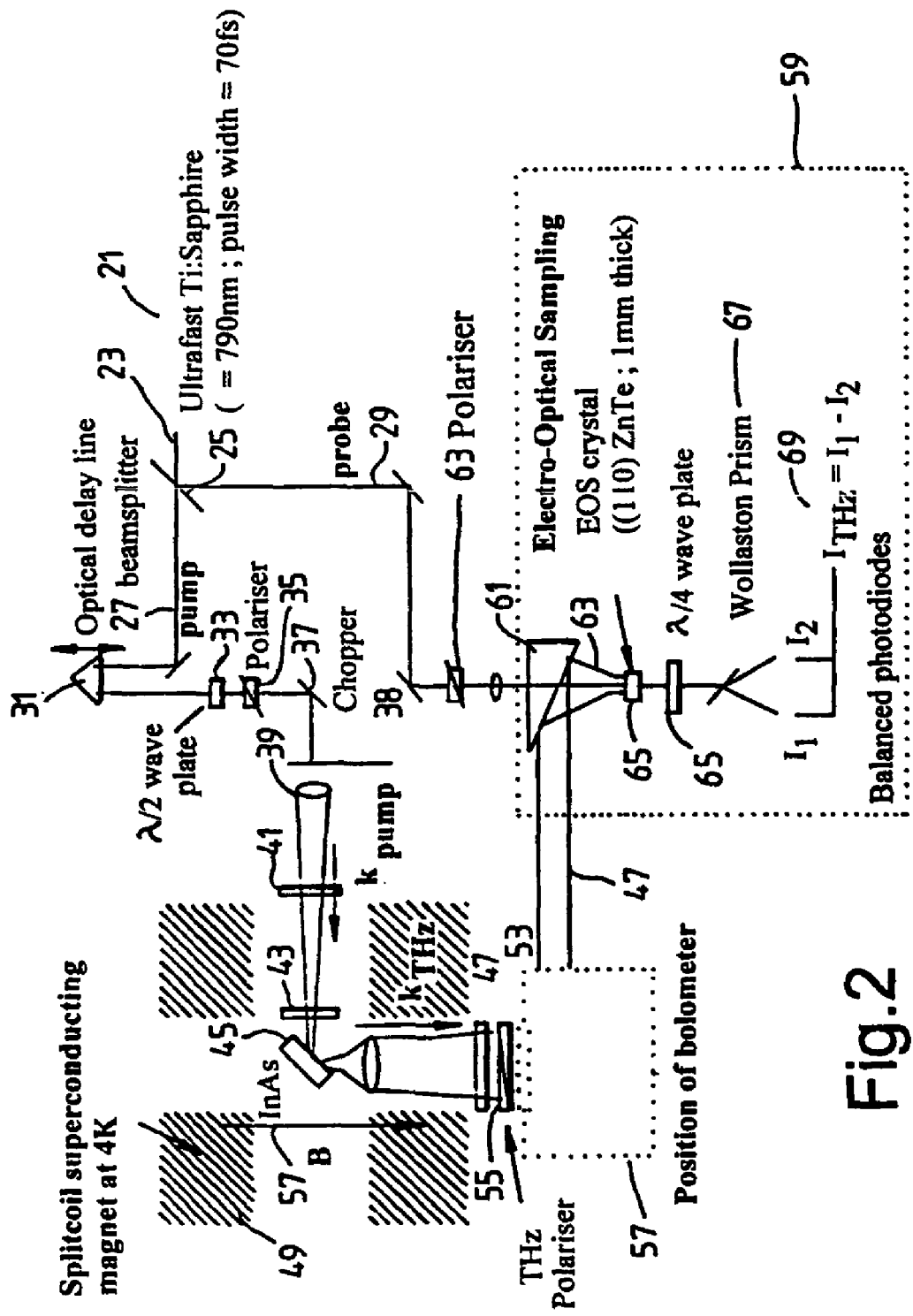
FIG. 2 is a schematic of the experimental arrangement to measure a source according to an embodiment of the present invention.

FIG. 2 shows an experimental arrangement which is used to generate THz in accordance with an embodiment of the present invention. A mode-locked Ti:Sapphire Laser 21 produces a beam 23 of 90 fs pulses at a wavelength of 790 nm and a repetition rate of 82 MHz. Beam 23 yields 0.8 W average power and has pulse energies in the nJ range. Beam 23 is split by beamsplitter 25 into a pump beam 27 and a probe beam 29. Eventually, it will be required to bring the probe beam and the pump beam back into synchronisation with one another or change the temporal shift between the pump beam and the probe beam. Therefore, the pump beam 27 is reflected off mirror 31. Thus, the path length of pump beam 27 can be varied. Mirror 31 reflects pump beam 27 through half wave plate 33 and into polariser 35. The polariser 35 transmits the beam onto mirror 37 which then reflects the beam through lens 39 and cryostat windows (e.g. Spectrosil B) 41 and 43 onto crystal 45. After the beam has passed through chopper 38, the beam is transmitted through lens 39. Crystal 45 is a frequency conversion member and is situated in a magnetic field. Emitter crystal 45 is also angled at 45 to the incident pump beam 27. Chopper 38 functions to chop the beam at a certain frequency. This can improve detection as the beam can be detected at the chopper 38 frequency using a lock-in amplifier. For this type of system, the chopper 38 will preferably be an acousto-optic modulator. Angles of Brewster's angle for the crystal source in question are preferable. For InAs, InSb and GaAs, the Brewster angle is about 70°. Thus, a reflected THz beam 47 is reflected from crystal 45 at an angle of 90 to pump beam 27. The magnetic field generated by a split coil superconducting magnet 49 is parallel to the direction of the emitted THz beam 47. The emitted THz beam 47 is then passed through cryostat window 53 and THz polariser 55.

FIG. 2 shows two methods for detecting the THz. The first of these is bolometer 57. This a He-cooled bolometer which is placed immediately after the cryostat to allow efficient collection of the emitted THz. Bolometer 57 measures both coherent and incoherent contributions to the THz power. In both detection mechanisms, polariser 55 allowed selection of either the transverse electric or transverse magnetic THz polarisation with a 10% transmission loss. Losses by other elements in the THz beam path were determined using an infra red transform spectrometer and accounted for 50% loss at a frequencies of 1 THz. The visible pump beam was also attenuated by 19% due to cryostat windows.

Either instead of or in addition to the bolometer, an electro-optic sampling detection mechanism 59 is also present in the apparatus of FIG. 2.

The electric-optic sampling system 59 relies on the ac pockels effect. The THz beam 47 is combined with pump beam 29 using mirror 61. Before passing through the back of mirror 61, probe beam 29 is passed through a polariser 63. The combined THz beam 47 and probe beam 29 are then directed onto a 1 mm thick (110) ZnTe crystal. Due to the ac pockels effect, the presence of THz beam 47 causes a rotation in the polarisation of pump beam 29. Therefore, the presence of THz can be detected. When the combined beam 63 has passed through detection crystal 65, it is then transmitted through quarter wave plate 65 to a Wollaston Prism 67 (or other polarisation splitting device) onto balanced photodiode arrangement 69.

If the polarisation of probe beam 29 has not been rotated, the balanced photodiode assembly will read 0. However, if the polarisation of the probe beam 29 has been rotated, there will be a difference in the intensity of the beams split by the Wollaston Prism which are detected by two photodiodes within the balance photodiode assembly 69. The difference in the output of the photodiodes will cause the magnitude of the output of the balance photodiode assembly to be greater than 0. The amount by which the polarisation of the probe beam 29 is rotated by the THz beam 47 is dependent on the intensity of the THz beam 47. Therefore, the output of the balance photodiode assembly 69 directly measures the electric field of the THz beam.

The evolution of the field with time is measured by varying the delay (via mirror 31) between the visible pump 27 and probe beams 29. The power spectrum associated with the THz radiation may be obtained by Fourier transforming the time-domain data The bandwidth of the THz pulse measured using the electro-optic sampling detector 59 of FIG. 2 extends from 0.5 THz to 2.7 THz. This bandwidth is in part constrained by the thickness of the detector crystal and prevents highly accurate measurement of enhancement at frequencies outside this range.

Figure 3:
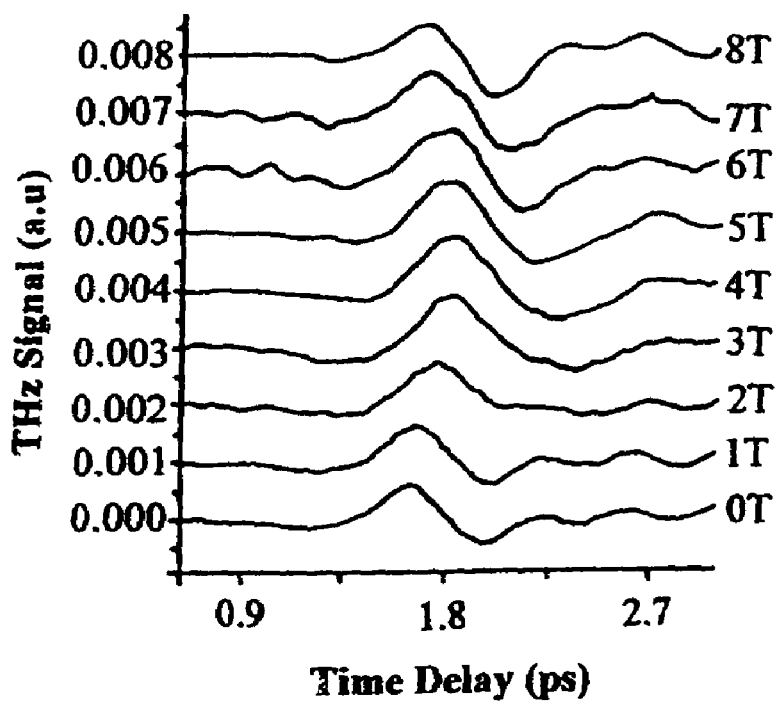
FIGS. 3a and 3b are plots of the transverse magnetic and transverse electric polarisation direction of a THz electric field emitted by a source according to an embodiment of the present invention.
Figure 3:
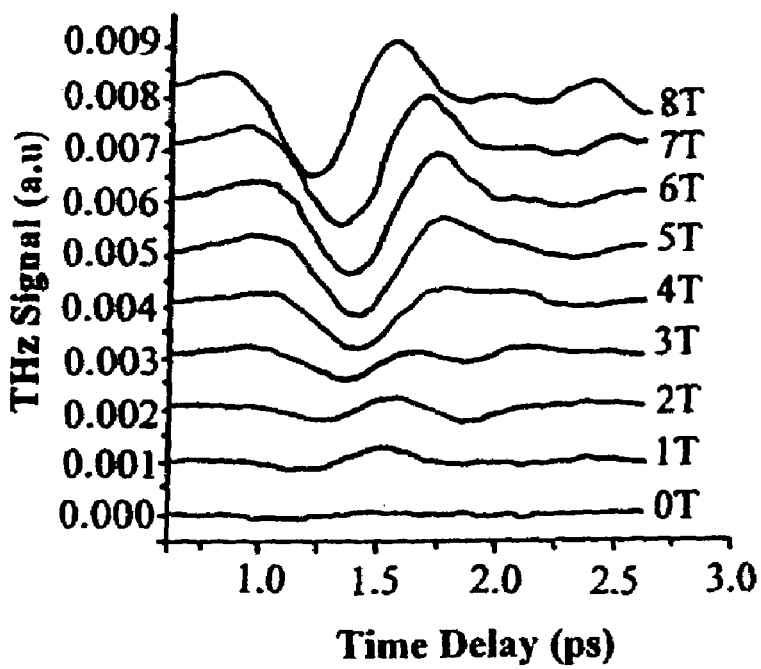

FIG. 3a shows the variation in the intensity of the THz signal as the time delay between the probe beam and the pulse beam is varied using mirror 31 for magnetic fields from 0 T–8 T. FIG. 3a shows the results for transverse magnetic polarisation and FIG. 3b shows the results of transverse electric polarisation.

Figure 4:
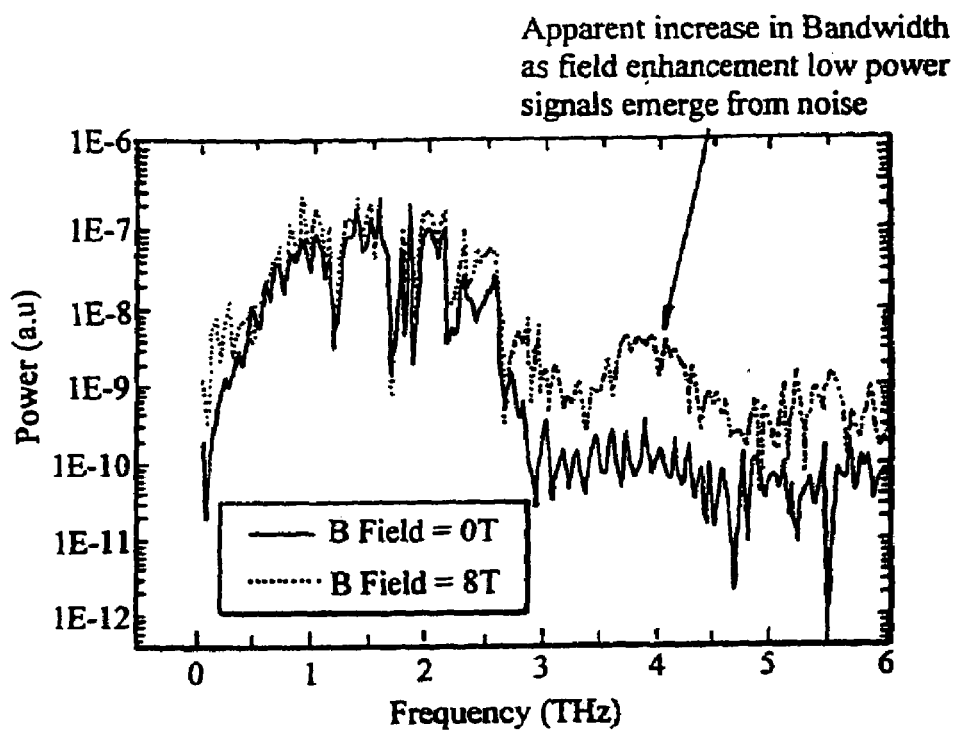
FIG. 4 shows a plot of the transverse magnetic polarisation component of a THz emission spectra form a source according to an embodiment of the present invention.

FIG. 4 shows the THz power measured using the experimental set up of FIG. 2 as a function of frequency obtained by Fourier transforming time-domain spectrum of the type shown in FIGS. 3a and 3b. An enhancement occurs across the most accessible THz bandwidth, accompanied by a relatively large increase f the power at frequencies above 2.7 THz. The behaviour was also observed for the transverse electric polarisation and was reproduced in spite of the reduced accuracy of detection in this range.

Figure 5:
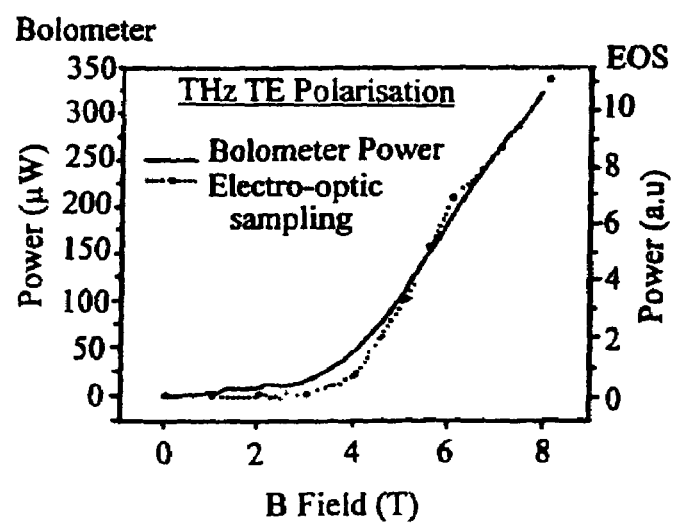
FIGS. 5a and 5b show plots of the power calculated from the tansverse magnetic and the transverse electric polarisations respectively, FIG. 5c plots the total power.
Figure 5B:
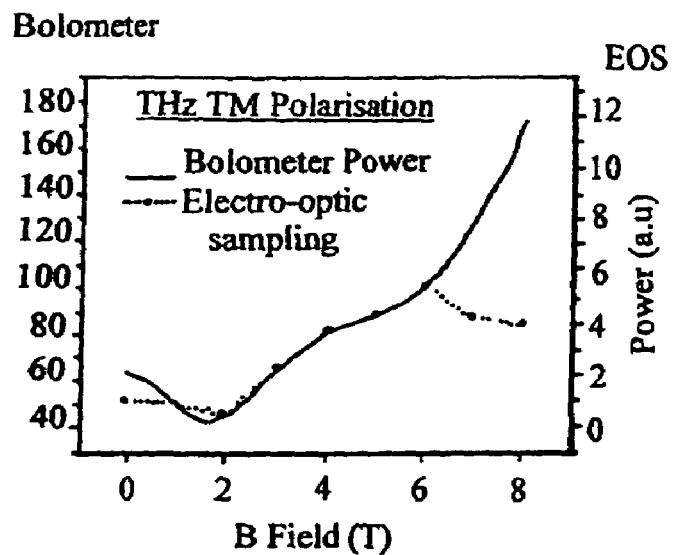
Figure 5C:
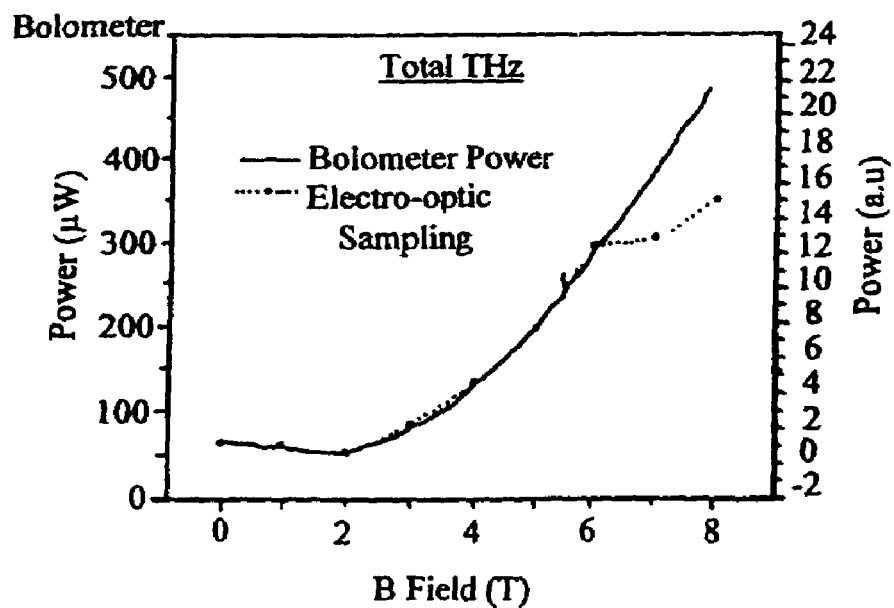

The amount of coherent power can be determined from the area under the frequency of the main power spectrum between 0.5 and 2.7 THz. Calculating this power for both polarisation components, ie. transverse magnetic and transverse electric allows a direct comparison with magnetic field dependence of the bolometer measurements which are shown in FIG. 5.

The dependence of the THz power on magnetic field is similar with the electro-optic sampling detector 59 and the bolometer 57 suggesting that the majority of field enhanced emission is coherent. There is a decrease in the intensity of the transverse magnetic polarisation component B>6 T which is not present in the bolometer measurement. This suggests that there may be a peak in the enhancement of a coherently generated THz for this polarisation. Such a peak is not observed in the transverse electric polarisation. These results suggest a further increase in magnetic field B were yield in a larger enhancement of the coherently generated THz power.

Figure 6:
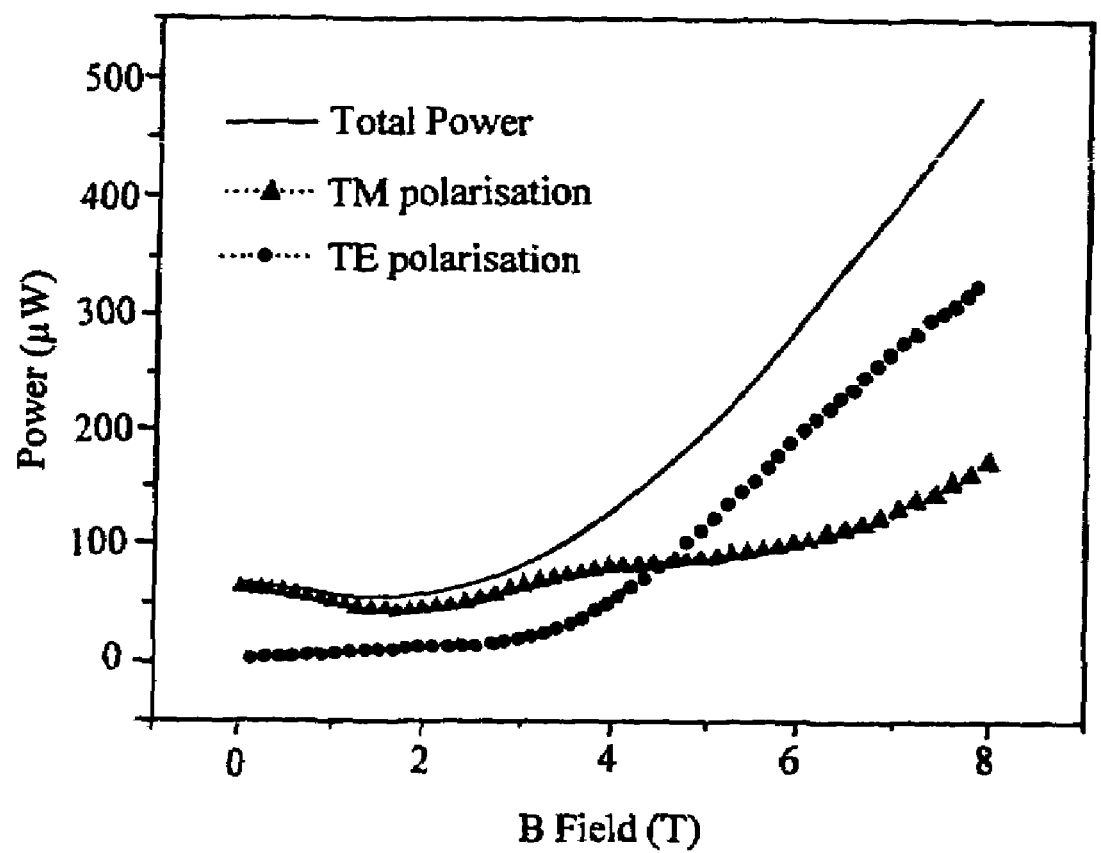
FIG. 6 is a plot of THz power from an InAs source according to an embodiment of the present invention.

FIG. 6 shows the dependence of the bolometer power on magnetic field for both of the individual polarisation components (i.e. transverse electric and transverse magnetic) as well as the total value. It can be seen that if the magnetic field is increased, both polarisation components are also increased. The total power is 486 mW at 8 T after accounting for losses in both the cryostat and the polariser. Path lengths between the cryostats outer window and the bolometer were kept less than 5 cm to minimise atmospheric absorption of the THz. Therefore, with an average incident pump power at the sample of 113 mW, the average power visible to average THz power conversion efficiency is 0.43%.

These results clearly suggest that going to even higher magnetic fields will result in even higher THz efficiency.

Figure 7:
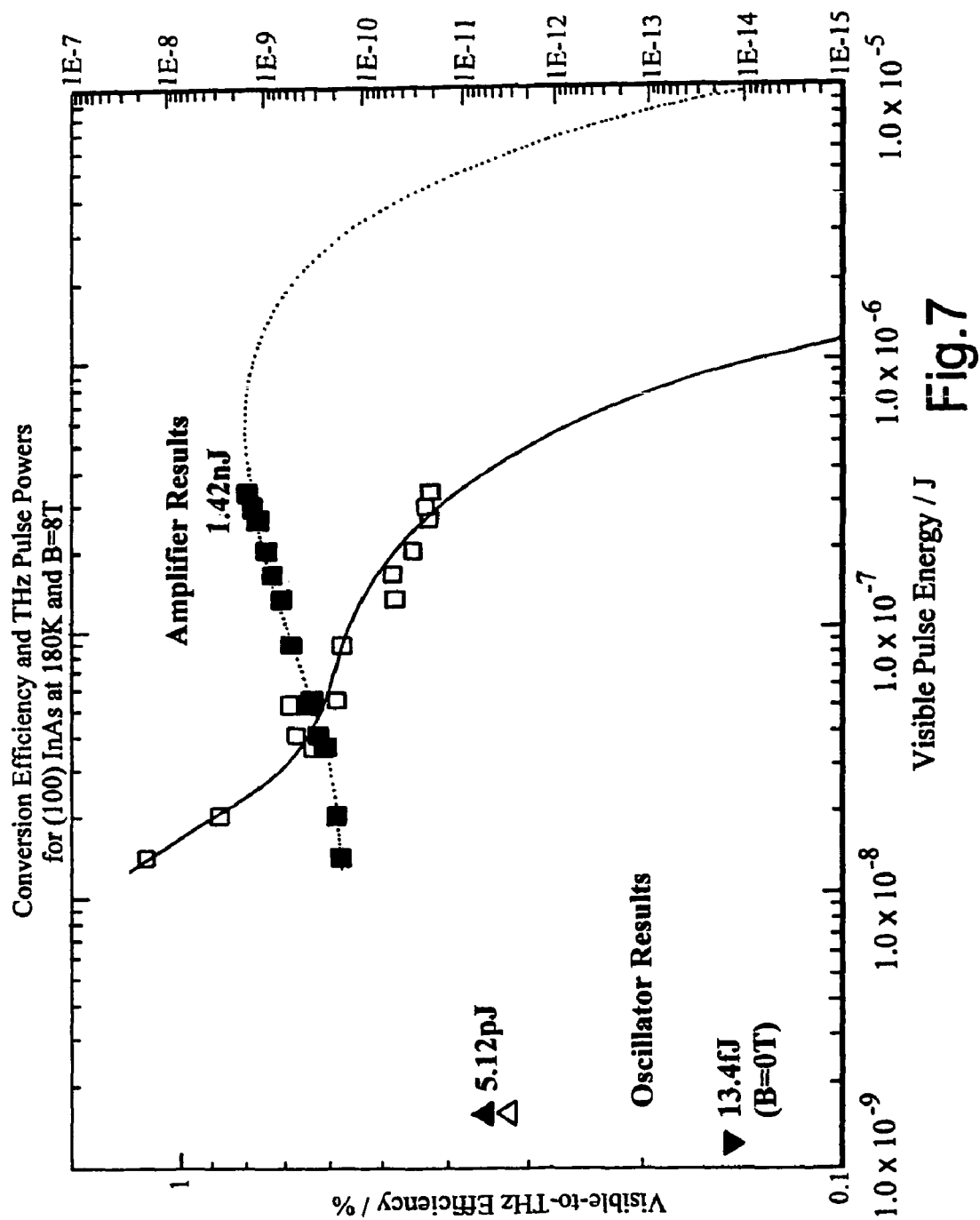
FIG. 7 shows a plot of THz conversion efficiency and THz pulse energy against the energy of the visible pulse.

FIG. 7 shows results taken at 8 T and 180 K for (100) InAs as a generator crystal. Sample geometry is the same as that described with reference to FIGS. 1 and 2.

The x-axis shows the variation in the visible pulse energy of the pump beam. The left-hand y-axis shows the visible THz conversion efficiency and the right-hand y-axis shows the measured THz pulse energy. The open symbols shows the energy for an unamplified, conventional oscillator source, and the closed symbols show those for an amplifier system. The lines through the closed symbols and the open symbols relate to a double exponential fit to the results. This graph suggests that increasing the visible pulse energy does not necessarily provide an increase THz signal. Therefore, other methods of increasing the THz signal are of commercial significance.

FIGS. 8a and 8b compare results taken in accordance with an embodiment of the present invention. With those of the known prior art. Specifically, the data points A to J are as follows:

A. 1 mm (110) ZnTe at room temperature, with no magnetic field. Pumped with 100 mW from an oscillator.

B. (100) InAs at 173 K and B=8 T, applied parallel to the direction of the THz beam.

Pumped 130 mW average power from an oscillator in accordance with an embodiment of the present invention.

C. (100) InAs at 173 K and B=8 T, applied parallel to the direction of the THz beam.

Pumped 83 mW average power (0.33 µJ pulse energy) from an amplifier in accordance with an embodiment of the present invention.

D. (100) InAs at room temperature and B=1.7 T, applied perpendicular to the direction of the THz beam. Pumped with 1.5 W from an oscillator. (Sakura et al. J. App. Phys. 84 654).

E. Large aperture photoconductive antenna on SI GaAs at room temperature, no magnetic field. Pumped with 882 mW (4.4 µJ) from an amplifier. (Mouret et al Microwave Opt. Tech. Lett. 17 23).

F. Large aperture photoconductive antenna on SI GaAs at room temperature, no magnetic field. Pumped with 500 mW (500 µL) from an amplifier. (Budiarto et al IEEE J. Quant. Elec. 32 1839).

G. Large aperture photo conductive antenna on SI GaAs at room temperature, no magnetic field. Pumped with 2.8 mW (282 µJ) from an amplifier. (You et al Opt. Lett. 18 290).

FIG. 9 shows a compact emitter in accordance with an embodiment to the present invention. The emitter comprises an electro magnet or a permanent magnet 71 which has a hole 73 formed therethrough. Hole 73 completely penetrates the magnet 71 and defines a space for the THz emitter space. The space is boarded on four sides by magnet 71 and at the upper 78 and lower 77 surfaces by non-magnetic material. The visible pump beam 75 enters the lower surface 77 of the emitter space 73. The pump beam 75 enters the emitter through pump window 79. The pump beam 75 is reflected off mirror 81 onto emitter crystal 83. The emitter crystal is angled with respect to the magnet and the incident beam 75 so that the emitted THz 85 is parallel to the direction of the magnetic field. The THz 85 is transmitted through THz window 87 which is located in the upper surface 78 of emitter space 73.

FIG. 10 shows a variation on the emitter of FIG. 9. The same reference numerals are used to denote the same features in both FIGS. 9 and 10. Therefore, these features will not be repeated here. The compact emitter here is capable of being cooled to very low temperatures. To achieve this cooling, the crystal 83 is mounted on a Peltier cooling element 89. The emitter space 73 has a vacuum port 91 such that the air within the emitter space can be evacuated.

FIG. 11 shows a further variation on the compact emitter structure of FIGS. 9 and 10. Again, the description of like features will not be repeated. The detection crystal 83 is mounted on an electro magnet or a permanent magnet 93. The electro magnet or permanent magnet causes a magnetic field which is normal to the surface of the emitter crystal 83. The THz beam 85 is again produced by refraction of the pump beam 75 of the surface of the semiconductor emitter crystal 83. The angle of incidence of the pump beam 75 is chosen so that there will be a component of the magnetic field in the direction of the THz beam output 85.

The geometry in these and other figures is also chosen such that the angle of incidence of the pump beam qB is Brewster's angle for the crystal in question.

FIG. 12 shows a further variation on the compact emitter structure. As for FIG. 9, an electro magnet or permanent magnet 71 is formed with an aperture 73 which provides a sample space. The aperture is bounded at a lower surface 72 and an upper surface 74 by material which is not part of the magnet 71. A THz window 87 is formed in the upper surface of the bounding material 74. A hole 95 is formed in a side wall of the magnet 73. This hole forms a channel for the visible pump beam 75. The hole is positioned such that the visible pump beam can be shone through the hole directly onto emitter crystal 83 without the need of mirrors within the compact emitter itself. The reflected THz beam 85 is transmitted from the compact emitter through THz window 87.

FIG. 13 shows a further variation on the emitter of FIG. 12. Here, as described with reference to FIG. 10, the crystal 83 is mounted on Peltier cooling element 89. The emitter space defined by aperture 73 must be evacuated. Therefore a vacuum port 91 is provided on a lower surface 77 of the compact emitter. The visible pump beam is again introduced into the compact emitter along channel 95. The pump beam entering the emitter is sealed with a window or lens 97.

FIG. 14 shows a THz emitter in accordance with a further embodiment of the present invention. The relationship between the input beam and the output beam with respective surface normal of the same as described with references to FIG. 1. Therefore, these features will not be repeated. However, the THz emitter crystal is different in FIG. 14 to that of FIG. 1. In FIG. 14, the THz emitter crystal (101) is imbedded with magnetic ions Mn2+. The strong S-D exchange interaction between the electron spins and the imbedded Mn2+ ions is known to amplify the frequency of the electron spin precession under the applied magnetic field. This results in field tuneable oscillations in the magnetic component of spin. It is known that these oscillations occur at THz frequencies. The frequencies given by the spin split energy $g\mu B$ where B is the applied magnetic field and 11B is the Bohr magneton. The increase in energy owing to the presence of interactions between carriers and the magnetic ions is given by the enhanced value of the g factor, which ranges from 2 in non-magnetic samples all the way to 430 or larger in magnetic samples. It is believed that enhanced g-factors may result in accelerations associated with electron spin of the radiated $g\mu B$ in the THz range. In FIG. 14, the magnetic field is arranged perpendicular to the surface normal and photo injected carrier spins.

Another mechanism for enhanced Terahertz emission from magnetically doped semiconductors is the enhanced internal magnetic field associated with the ions, which leads to further acceleration of charge in the semiconductor and hence higher Terahertz emission powers. With the application of a small external magnetic field (e.g. several hundred millitesla, readily achieved with permanent magnets), the moments of the Mn2+ ions are aligned.

One motivation for introducing magnetic ions into the semiconductor is to reduce the magnetic fields required for THz enhancement from the several Tesla values suggested above, which may require superconducting magnets, to B<2 T achievable with permanent or electromagnets. Moreover, even is semiconductors where significant enhancement of the visible to THz conversion efficiency occurs at low magnetic fields, the addition of magnetic ions will further enhance the field, and hence conversion efficiency, achievable. To see this, note the net field inside a magnetically-doped semiconductor is given by $$B_{net} = B_{applied} + moMxMn$$

where Bapplied is the externally applied field inside the semiconductor (denoted simply by B in the preceding discussion). mo is the permeability and MxMn is magnetization associated with the ions; thus $B_{ion}$=mo MxMn is the magnetic field in the semiconductor in the presence of the magnetic ions.

The ultrafast laser sources can be those described. The laser must operate at frequencies at or above the band gap of the material in order to create photocarriers. Circular polarisation of the pump beam is generally required, achieved using standard quarter wave plates, if the spin of the photocarriers is to be oriented parallel to the surface normal.

The magnetically doped may be fabricated in a number of ways:

Numerous types of magnetically doped frequency conversion members 101 are possible. Bulk Zn1−x=0.9Mnx=0.1Se grown on <100> GaAs or other compatible substrates are one class of structure. X=0 to 0.1 have been studied using optical and ESR characterization techniques, but higher concentrations x are possible using MBE.

(Ga,Mn)As bulk layers are other systems for realising internal magnetic fields to supplement the externally applied field. (Ga,Mn)As can be grown on (001) GaAs substrates using techniques such as low temperature MBE. For example, 100 nm GaAs buffer layers may be grown at 570 C, followed by 0.2 mm (AlxGal-x)As0.8 etch stop layer for any processing and mesa isolation. This layer is grown at 670 C. Finally, a 2 mm (Ga,Mn)As layer is grown. Typical Mn concentrations are in the range 0.043, although other concentrations are possible using MBE.

ZnCdSe/ZnSe quantum wells on <100> GaAs having different concentrations of Mn2+ form an important class of structures. Discrete fractional monolayer planes of the binary magnetic semiconductor MnSe are incorporated into the ZnCdSe wells. The quantum well region thus consists of monolayers of the randomly diluted quartenary alloy (ZnCd,Mn)Se separated by nonmagnetic layers of say Zn0.8Cd0.20Se. The introduction of magnetic ions into the crystal lattice greatly enhances the effective g factors of the electron and hole bands through strong spin sensitive Jsp-d exchange interaction between the s-like (p-like) conduction (valence) band and the local 3d electrons that comprise the spin-5/2 paramagnetic Mn2+ moment. There are advantages to various distributions of the magnetic ion layers in the quantum wells. For example, for a fixed number of Mn spins, the g-factor may be enhanced by spreading the distribution of MnSe from a single, thick layer placed at one position in the ZnCdSe well, to several layers distributed in different planes throughout the well. This also mitigated against dephasing phenomena due to ion—ion interactions.

FIG. 15 shows an experimental arrangement for measuring THz output from a magnetically doped semi-conductor. As many of the features are the sane as described in reference to FIG. 2, these will not be repeated. The main variation on the equipment of FIG. 2 is the variation in the orientation between the magnetic field and the emitted THz. Here, the pump beam is transmitted onto a magnetically doped semiconductor crystal emitter in the direction parallel to the surface normal of the semiconductor crystal emitter. The magnetic field B is arranged so that it is parallel to the surface of the semi-conductor crystal emitter. The THz beam (57) is emitted parallel to the surface normal of the emitter. The beam (47) is then reflected off beam-splitter (121) which reflects the THz-bean onto mirror (123) and into the electro-optic sampling unit (59). The beam-splitter (121) allows transmission of the pump beam onto the cryostat window. The beam splitter may be a suitable material such as cellulose nitrate, mylar, or other materials that are ideally non-lossy and non-dispersive at both THz and visible/near-infrared frequencies.

FIG. 16 shows a further embodiment of the present invention. Here, an external bias is applied via contacts 201) and 203 across the surface of the THz emission crystal 205. The THz emission crystal 205 can be any of the type previously described. It may also be a magnetically doped structure.

The incident pump beam 207 then impinges on the emitter 2 or 5 in the region between the two contacts 201 and 203. The bias between the two contacts causes a lateral photo-current to arise. The magnetic field 209 is incident on the sample at an angle of θ (theta) so that the emitted THz experiences a component of the magnetic field. The THz may be emitted via refraction or transmission through the sample 205.

Contacts 201 and 203 may take many forms. For example, as shown is FIG. 16*a*, the contacts may be regular, rectangular contacts. However, as shown in FIG. 16*b*, the contacts may be made in the shape of a bow tie antenna.

The contacts 201 and 203 may be Ohmic contacts. The distance between the two contacts may be varied between several microns to several millimeters.

FIG. 17 shows a further arrangement used to enhance the field at the surface to enhance THz emission. FIG. 17*a* shows and experimental arrangement similar to that of FIG. 1. However, here, the emitter crystal has a front gate 301 located on the surface on which the pump beam impinges. The front gate 301 is a Schottky gate, the gate acts to modify the shape of the surface field in the semiconductor to enhance the THz emission. The gradient to the surface field enhances carrier acceleration at the surface and this enhances THz emission.

Typically, the gate will be fabricated from Au, NiCr etc.

The previous embodiments have mainly concentrated on enhancing the THz output by increasing the acceleration of the charged carriers in the frequency conversion member by using techniques such as applying an electric field to the surface of the frequency conversion member, using magnetic dopants etc.

However, it is possible to also enhance the THz emission by careful choosing of the applied magnetic field and the free carrier concentration which is controlled by the optical fluence of the input beam.

FIG. 18 shows a measurement from a source which comprises a undoped GaAs frequency conversion member, the incident radiation surface is (100), the optical fluence is varied from 50 to 900 nJ/cm2. The plot of FIG. 18 is a logarithmic plot in both the x and y directions (Fluence of input beam and Power of emitted beam respectively).

The data is shown for four values of magnetic field: 2 T (empty circles); 4 T (solid circles); 6 T (triangles) and 8 T (squares). The 4 T data has been fitted (as will be explained below) and is shown by the solid line. The plot demonstrates the cross over between the low fluence regime (where the data fits to the solid line) and the high fluence regime (where the data diverges below the solid line).

The scattering length of the free carriers in the frequency conversion member increases with applied magnetic field due to charge executing a larger portion of cyclotron orbit before scattering off in adjacent electron or other particles. Cyclotron orbits are given by the well known classical formula in one, two or three dimensions and depend on both the optically induced (pump-induced) carrier density n as well as the applied magnetic field B and the material dependent effective mass of the accelerated charge m.

FIG. 18 shows the cross over from the low optical fluence limit to the high optical fluence regime. In the low regime, carrier-carrier scattering is the dominant mechanism which limits the enhancement of THz power and one set of design procedures is used.

In the high fluence limit, the screening of the electric field is the dominant mechanism limiting the enhancement of THz power.

In the presence of a fixed magnetic field such as one might find in a superconducting magnet in persistent mode (the type found for example in MRI machines) or a fixed permanent magnet, one of the best ways to determine the limit of the optical fluence is to plot out the experimentally measured THz power as function of adjusted optical fluence (determined by laser power and/or spot size adjustment, or other means). Along with this, one plots the relation which governs emitted power in the presence of carrier-carrier scattering. The time-averaged emitted power can be approximated with the expression:

$$P \propto \frac{n^2 B^2}{m^4} \left[ \frac{\cos\theta_M \sin\theta_M}{2\theta_M} + \frac{1}{2} \right], \quad (1)$$

where P is the power of the emitted beam, n is the free carrier concentration, m is the effective mass of the carriers, B is the magnetic field and $\theta_M$ represents the angle completed by the carrier at the time of the collision, and r is the cyclotron radius. This angle can be expressed as a function of the ratio $R=\lambda/r$ of the characteristic radius as $$\theta_M = \arccos\left[ 1 - \frac{1}{2}\left(\frac{\lambda}{r}\right)^2 \right], \quad (2)$$

which is only valid for $(\lambda/r) < \sqrt{2}$. For magnetic fields B smaller than 10 T, (2) can be approximated as a linear function of B, $\theta_M \approx \alpha B$. In this limit, (1) reduces to $$P \propto \frac{1}{m^4} \times \left[ \frac{B \sin(2\alpha B)}{4\alpha} + \frac{B^2}{2} \right] \quad (3)$$

Comparing the Terahertz power P (1) as function of optical fluence (or equivalently, photogenerated carrier density n in (1)) with the experimental determination noted above allows one to determine whether one is in the low or high optical fluence limit. In the low fluence limit the experimental data can be made to lie along the same line as that derived from (1) with a suitable multiplicative factor applied to one or the other data set. In the high fluence limit, there is significant deviation of experimental data below the prediction of (1) at higher optical fluences, whereas at lower fluences the lines coincide.

Put more succinctly, to determine the fluence limit, one first measures experimentally determined powers as a function of fluence and then fits them to (1), with weight given to the points at low fluence.

FIG. 18 shows such a fit for B=4 T. The fluence value at which divergence (expt data falls below predictions of (1)) between (1) and the experimental data occurs marks the boundary; fluences below this are in the low fluence limit, and fluences above it are in the high fluence limit.

In FIG. 18, this occurs near fluences of 400 nJ/cm² for B=4 T in the case of GaAs. FIG. 18 also demonstrates how the limit will vary with the value of B applied. The limit in which the system falls will be determined by the magnetic fields B provided by available magnets, and range of laser fluences available with the ultrafast laser. Choice of material system and its characteristics will also play a role.

Scattering is believed to be the main mechanism which is responsible for controlling the emitted THz power. Practical limits are also imposed by the availability of fields using permanent magnets and the high cost associated with superconducting magnets, which rises with magnetic field. The electron-electron scattering will reduce THz power appreciably until the limit where the cyclotron diameter is comparable to the electron-electron scattering length, i.e. 2 r is preferably equal to, but may be less than the electron-electron scattering length $\lambda = n^{-1/3}/2$.

As both the cyclotron diameter and the electron-electron scattering length are dependent on B and n (optical fluence), these need to e optimised simultaneously. The design rule therefore is to choose a magnetic field for a given fluence (or fluence for given magnetic field) such that 2 r~λ. Scattering between adjacent electrons result in decoherence of the Terahertz waveforms emitted by those accelerated electrons and hence reduced Terahertz power. Decoherence here means that the emitted waveforms from the accelerated charge do not add or combine constructively, i.e. no constructive interference.

In general, electron-electron (or more generally carrier-carrier) scattering is the dominant mechanism at low optical fluences, leading to low photogenerated carrier densities. The design rule above ensures that the length of the electron trajectory s is maximised before scattering off the next adjacent electron located λ away. This is shown schematically in FIG. 19. In FIG. 19, the direction of THz beam (the emitted beam $k_{THz}$) is into the page and the magnetic field B is perpendicular and out of the page. The plane of the cyclotron orbit is within the plane of the page.

FIG. 20 illustrates the calculated cyclotron radius for values of magnetic field (2 T, 4 T, 6 T and 8 T) against optical fluence (solid lines). The mean free path for an optical fluence of 20 nJ/cm², is shown as a weak dotted line.

For an optical fluence of 20 nJ/cm², the intersection of the λ(n) vs. n (weak dotted line) and r(n) vs. n (solid lines) suggests that B=6 T is the optimal field, e.g. compromise between reducing electron-electron scattering and thereby maximising power with higher field (hence longer mean free path s) and the practicalities and cost of high magnetic fields.

FIG. 21 shows a plot of THz radiation from (100) GaAs measured by a bolometer as a function of the applied magnetic field (T=200 K). Circles, triangles and dashed line represent TE, TM-polarised and total emitted power respectively. Crosses are rescaled EOS data (THz field amplitude squared). Solid line is a fit to TE data (circles) with equation (3).

It is often desirable to use a high fluence as, under many types of conditions this will give the highest output power. However, in the high fluence regime, screening of the surface field becomes the dominant mechanism, and the term $E_{surf}$ is dramatically reduced. This means that the efficiency of the source reduces even through the power of the emitted beam increases with the power of the input beam.

The effect of fluence on surface field is illustrated in FIG. 22, where the surface field is plotted as a function of depth into the semiconductor from the surface of the sample. The plots were done using a Monte Carlo simulation. The results suggests that in the high fluence limit, screening of the surface field is reduced—and THz power enhanced—with the application of magnetic field. The results suggest that this is valid for time scales from t=0 to t=2 ps, where t=0 is when the Terahertz pulse is received at the detector.

FIG. 23 is a plot of the values of the input beam fluence where the fluence crosses from the low regime to the high regime for 5 different magnetic field values (0 T, 2 T, 4 T, 6 T and 8 T).

This data was found to fit the general exponential function:

$$F=F_0+A exp(B/t)$$

where F is the fluence of the input beam, B is the magnetic field and $F_0$, A and t are fitting parameters. In this particular example, $F_0$=70, A=56 and t=5.7.

Thus, the boundary between the low and high fluence regimes increases exponentially with increasing magnetic field.

The fluence measurements were taken from the data of FIG. 18 where the experimentally measured THz power drops approximately 10% below the linear fit of (1) to the low fluence data. Thus, when dealing with high fluences, it is desirable to choose a magnetic field such that the source is on the boundary between the low and high fluence limits. Similarly, the optical fluence can be adjusted for a given magnetic field so that it lies on the line of FIG. 23.

By way of example, FIG. 23 shows the optimal magnetic field (B=4.7 T) for a set laser fluence of 200 nJ/cm².

What is claimed is:

1. A radiation source comprising a frequency conversion member configured to emit a beam of emitted radiation in response to irradiation with an input beam with a frequency different to that of the emitted radiation, the source being subjected to a magnetic field wherein the free carrier concentration of the frequency conversion member and the applied magnetic field is configured such that the cyclotron diameter of the free carriers of the frequency conversion member is within 30% of their scattering length.

2. The radiation source of claim 1, wherein the input beam is circularly or elliptically polarized.

3. The radiation source of claim 1, wherein the magnetic field has a component parallel to that of the emitted beam.

4. The radiation source of claim 1, wherein the emitted beam is produced by reflection of the input beam off a surface of the frequency conversion member.

5. The radiation source of claim 1, wherein the magnetic field is oriented parallel to the emitted beam.

6. The radiation source of claim 1, wherein the magnetic field is oriented at an angle of at most 20° to the emitted beam.

7. The radiation source of claim 1, wherein the frequency conversion member is selected from InAs, InSb and GaAs.

8. The radiation source of claim 1, configured such that the angle between the input beam and the surface normal of the frequency conversion member is substantially the Brewster angle.

9. The radiation source of claim 1, wherein the frequency conversion member is subjected to a magnetic field of at least 2 T.

10. The radiation source of claim 1, the source further comprising a magnet to apply the said magnetic field.

11. The radiation source of claim 1, wherein the emitted radiation comprises at least one frequency in the ranges from 0.1 THz to 100 THz.

12. The radiation source of claim 1, wherein the input beam is a pulsed beam.

13. A radiation source comprising an irradiator, a magnetic field generator and a frequency conversion member configured to emit a beam of emitted radiation in response to irradiation by the irradiator with an input beam having a frequency different to that of the emitted beam of radiation, the conversion member being is subjected to a magnetic field, and the magnetic field and fluence of the input beam being configured to minimize the screening effect of free carriers in the frequency conversion member.

14. A radiation source comprising a frequency conversion member configured to emit a beam of emitted radiation in the range 0.1 THz to 100 THz in response to irradiation with an input beam with a frequency different to that of the emitted beam, the frequency conversion member comprises a magnetic material dopant.

15. The radiation source of claim 14, wherein the dopant is Mn.

16. A radiation source comprising a frequency conversion member configured to emit a beam of emitted radiation in response to being irradiated with an input beam with a frequency different to that of the emitted beam, the source being subjected to a magnetic field, the source further comprising means for applying an electric field at the surface of the frequency conversion member which is irradiated by the input beam.

17. The radiation source of claim 16, wherein the means for applying an electric field comprise a pair of Ohmic contacts provided to the frequency conversion member and means for applying a potential difference across said Ohmic contacts.

18. The radiation source of claim 17, wherein the Ohmic contacts have a substantially triangular shape such that the contacts taper towards one another.

19. The radiation source of claim 16, wherein the means for applying a field comprises a Schottky gate provided on the surface of the frequency conversion member which is irradiated by the input beam.

20. A radiation source comprising a frequency conversion member configured to emit a beam of emitted radiation in response to irradiation with an input beam with a frequency different to that of the emitted radiation, the source being subjected to a magnetic field which has a component parallel to that of the emitted beam of radiation, the emitted beam of radiation being produced by reflecting the input beam off a surface of the frequency conversion member.

21. A method of optimizing a radiation source, the radiation source comprising a frequency conversion member configured to emit a beam of emitted radiation in response to irradiation with an input beam with a frequency different to that of the emitted radiation, the method comprising the step of applying a magnetic field to the source, the magnitude of the magnetic field being chosen in order to minimize the screening of the surface field of the frequency conversion member by free carriers in the frequency conversion member for a predetermined fluence of the input beam.

22. A method of optimizing a radiation source, the radiation source comprising a frequency conversion member configured to emit a beam of emitted radiation in response to irradiation with an input beam with a frequency different to that of the emitted radiation, the method comprising the step of applying a magnetic field to the source, the fluence of the input beam being chosen in order to minimize the screening of the surface field of the frequency conversion member by free carriers in the frequency conversion member for a predetermined magnitude of the applied magnetic field.

23. The method of claim 22, wherein the magnitude of the applied magnetic field or the optical fluence is determined by the steps of:
  a) measuring the power of the emitted beam as a function of optical fluence for at least three values of magnetic field;
  b) fitting the data measured in a) to the relation:

$$P \propto \frac{n^2 B^2}{m^4} \times \left[ \frac{\cos\theta_M \sin\theta_M}{2\theta_M} + \frac{1}{2} \right], \quad (1)$$

where P is the power of the emitted beam, n is the free carrier concentration, m is the effective mass of the carriers, B is the magnetic field and $\theta_M$ is:

$$\theta_M(n, B) = \arccos\left[ 1 - \frac{1}{2}\left(\frac{\lambda}{r}\right)^2 \right], \quad (2)$$

where $\lambda$ is the mean free path which is defined as $\frac{1}{2}(n^{-1/3})$ and r is the cyclotron radius;
  c) determining the fluence values for the at least three values of magnetic field where with increasing fluence the measured power starts to diverge from the function of step b); and
  d) fitting an exponential function to the at least three values determined in point c) such that the optimum fluence can be determined for a given magnetic field or an optimum magnetic field can be determined for a given fluence.

* * * * *